(12) United States Patent
Miller

(10) Patent No.: US 11,283,398 B1
(45) Date of Patent: Mar. 22, 2022

(54) 90° OR 180° HINGE WITH STOPS

(71) Applicant: Gregory K. Miller, Mansfield, TX (US)

(72) Inventor: Gregory K. Miller, Mansfield, TX (US)

( * ) Notice: Subject to any disclaimer, the term of this patent is extended or adjusted under 35 U.S.C. 154(b) by 0 days.

(21) Appl. No.: 17/525,923

(22) Filed: Nov. 14, 2021

Related U.S. Application Data

(63) Continuation of application No. 17/187,694, filed on Feb. 26, 2021, now Pat. No. 11,177,765.

(51) Int. Cl.
| | |
|---|---|
| *B62B 3/02* | (2006.01) |
| *H02S 30/20* | (2014.01) |
| *H02S 10/40* | (2014.01) |
| *H02S 30/10* | (2014.01) |
| *F16M 11/22* | (2006.01) |
| *F16M 11/38* | (2006.01) |
| *B62B 3/10* | (2006.01) |

(52) U.S. Cl.
CPC .............. *H02S 30/20* (2014.12); *B62B 3/02* (2013.01); *B62B 3/108* (2013.01); *F16M 11/22* (2013.01); *F16M 11/38* (2013.01); *H02S 10/40* (2014.12); *H02S 30/10* (2014.12); *B62B 2206/006* (2013.01)

(58) Field of Classification Search
CPC ............ B62B 3/02; B62B 3/108; F16M 11/38
See application file for complete search history.

(56) References Cited

U.S. PATENT DOCUMENTS

| | | | |
|---|---|---|---|
| 6,201,181 B1 | 3/2001 | Azzam | |
| 6,396,239 B1 | 5/2002 | Benn | |
| 7,105,940 B2 | 9/2006 | Wessner et al. | |
| 7,821,147 B2 | 10/2010 | Du Bois | |
| 8,109,472 B1 | 2/2012 | Keller et al. | |
| 9,046,281 B2 | 6/2015 | Curran | |
| 9,121,189 B2 | 9/2015 | Hixson et al. | |
| 9,196,771 B2 | 11/2015 | Rodin et al. | |
| 9,246,035 B2 | 1/2016 | Eaton, Jr. | |
| 9,287,822 B2 | 3/2016 | Levi et al. | |
| 9,324,893 B1 | 4/2016 | Kats et al. | |
| 9,422,922 B2 | 8/2016 | Sant'Anselmo et al. | |
| 9,819,304 B2 | 11/2017 | Feng | |
| 9,866,167 B2 | 1/2018 | Chambe et al. | |
| 10,720,541 B2 | 7/2020 | Gerwing et al. | |
| 2008/0210289 A1* | 9/2008 | Chen ....................... | H02S 20/00 136/244 |
| 2011/0193513 A1* | 8/2011 | Wagnon .................. | H02S 40/32 320/101 |

(Continued)

OTHER PUBLICATIONS

Grid Eraser Portable Solar Power Systems (2020); http://www.grideraser.com/generators.html.

(Continued)

*Primary Examiner* — Jonathan Ng

*Assistant Examiner* — James J Triggs

(74) *Attorney, Agent, or Firm* — Sierra IP Law, P.C.; Mark Miller

(57) ABSTRACT

Disclosed are hinges having specially-cut sections of steel angle iron that force a solid stop point in the open or closed positions. In some embodiments, the stops may limit the hinges to open no more than 90 degrees. In other embodiments the stops may limit the hinges to open no more than 180 degrees. The hinges provide stability to any structure they are used with.

7 Claims, 21 Drawing Sheets

(56) References Cited

U.S. PATENT DOCUMENTS

| | | | |
|---|---|---|---|
| 2011/0253615 A1 | 10/2011 | Curran et al. | |
| 2012/0293111 A1 | 11/2012 | Sentinelli et al. | |
| 2013/0037080 A1 | 2/2013 | Helfan et al. | |
| 2013/0118099 A1 | 5/2013 | Scanlon | |
| 2014/0048124 A1 | 2/2014 | Park et al. | |
| 2014/0284292 A1 | 9/2014 | Pantel | |
| 2014/0356198 A1* | 12/2014 | Rulli | F04B 17/006 417/360 |
| 2015/0075880 A1* | 3/2015 | Grossen | B60L 50/60 180/2.2 |
| 2016/0020727 A1* | 1/2016 | Cheung | H02S 20/30 136/245 |
| 2016/0270563 A1 | 9/2016 | Contrata, Jr | |
| 2018/0062572 A1 | 3/2018 | Kunesh | |
| 2019/0085552 A1 | 3/2019 | Merrifeld | |
| 2020/0350854 A1 | 11/2020 | Tehan et al. | |
| 2021/0053698 A1 | 2/2021 | Hoeper | |

OTHER PUBLICATIONS

Ameresco Solar, Mobile Solar Power Trailers, Kits, and Systems (2020); https://www.amerescosolar.com/solar-power-mobile-solutions.

DuBee Solar, Solar Power Trailer Kits (2018); https://dubeesolar.com/solar-power-trailer-kits/.

ESSA Systems—Meridian Folding Solar Panel Array (2020); https://www.youtube.com/watch?v=vll1sO34ScA.

Patriot Solar Group—solar trailers (2020); https://patriotsolargroup.com/products/solar-trailers-sunpad/.

Designer Eco Tiny Homes—non-foldable solar panel trailers (2020); https://designerecotinyhomes.com.au/solar-power/.

Q13 Fox, Seattle—News Article: "How in The World Did Thieves Steal Trailer Covered in Working Solar Panels?" (2014); https://www.q13fox.com/news/how-in-the-world-did-thieves-steal-a-trailer-covered-in-working-solar-panels.

* cited by examiner

90° OR 180° HINGE WITH STOPS

This is a continuation of U.S. patent application Ser. No. 17/187,694 filed on Feb. 26, 2021, which is incorporated herein by this reference in its entirety.

BACKGROUND OF THE INVENTION

The present invention relates to providing solar power, and more particularly to portable solar array support systems that may be folded into a compact form for ease of transport, and which may then be deployed in remote locations to support multiple large, heavy solar panels that provide significant power that would otherwise not be available.

Solar panels have become more prevalent and less expensive in recent times, but there has been no simple and effective way to transport and quickly deploy a solar array of intermediate size. Larger solar systems have a more permanent nature, since they are typically mounted on a rooftop or on a large trailer; and smaller portable systems are typically used for camping or emergency backup for power outages. Trailer-mounted and rooftop systems are bulky and expensive, and deliver much more power, but they have a high cost and ordinarily require permitting. A typical small "portable" solar array is ordinarily capable of producing 100 to 300 watts of solar output. This is a very low amount of power which may be enough to operate one or two appliances, but is insufficient if any significant number of items are to powered. The power available is even lower if the user considers that the solar system also has to recharge an inverter package for night or inclement weather use.

However, there is a gap between small portable emergency or campsite solar panel systems and larger more permanent systems such as rooftop or trailer-mounted systems. What is left is a significant demand for intermediate systems that are both portable and capable of powering a large number of devices.

Embodiments of the present invention provide methods and apparatus which address these needs.

SUMMARY OF THE INVENTION

Embodiments of the present invention provide methods and apparatus for providing portable solar array support systems that may be folded into a compact form for ease of transport, and which may then be deployed in remote locations to support multiple large solar panels that are capable of providing significantly more power than a small camping or emergency generator for energizing a significant number of items.

Embodiments of the foldable array (aka Fold Array) of the present invention include a highly transportable solar array support system that folds up into a very small footprint. This allows such systems to potentially be stored in a space as small as a closet or shed. More than one foldable array can be nestled for even further efficiency of storage space. With just a few moves, embodiments of the invention may be moved about and deployed quickly and reliably by just one person of reasonable strength.

In some aspects of the invention, a unique integrated hinge system is provided as part of the design. Embodiments of this hinge system utilize simple metal angle iron to force a positive stop at either 90° or 180°. The 90° hinges use the edge of the angle iron to make the positive stop. The 180° version is more unique. With careful shaping of the angle iron, a positive stop is also accomplished at 180° which is not possible for the basic 90° version. Since the angle iron can be any length after the hinge shape at the end, the hinge can also offer on offset that is used to displace the support of the solar panels assuring a very compact alignment when folded. This offset is carefully chosen to force the panels to lay parallel to each other when in the open position. The hinge protrudes so little when open that there is virtually no chance for a shadow which is known to lessen the efficacy of solar panels. The integrated hinges also offer overlapping surfaces that can be easily pinned into place for greater strength and stability.

Embodiments of the invention also include two systems that help make the set up safe and accurate. The first of these is a swinging brace. This simple free-hanging appendage quickly takes the weight of the system as the user tilts it into deployment position. Embodiments of the swinging brace rest against a large handle that doubles as a primary steering component, much like a shopping cart. This is important since an opposite end of the array cart is often on wheels and could roll out from under the operator without the help of the brace. The second feature is a control arm that forms a parallelogram between the cart and the angled legs. This forces the legs to present themselves at a 90° angle to the cart at all times. As each of the legs is directed into place, the angled leg is forced to follow. This assures that weight of the side panels is quickly assumed by the angled leg as it comes into contact with the ground. This leg may also be set for a prescribed angle of the array. In some embodiments, there is a feature that provides for an opportunity to pin the side panels in place. Alternatively, the pins can be left off if the user is on substantially uneven ground or there is minimum concern for windy weather.

Portability is another feature of the foldable arrays of the present invention. Embodiments of the folded system can easily be pushed about like a shopping cart. Large wheels may be provided to help roll over grass and uneven ground. Embodiments having a wide, flat back help stabilize the folded array in the case that it is stored or transported on is back, such as, for example, on a pickup truck. In such embodiments, the operator may roll the array up to the bed of the truck and then tilt it backward onto the bed of the truck. This presents a lower profile sticking up out of the bed of the truck. The folded arrays of the present invention should always be secured with straps or other means like any cargo being transported in a moving vehicle.

Embodiments of the foldable array may hold the solar panels at a fixed angle to the sun. This angle is derived by the average angle of the sun in a given region. Typically that angle is specified by setting it at an angle equal to the latitude of the region in which the array is to be used. In a year, the sun will track approximately +/−15° from this average angle. The swinging brace and angled legs can be substituted with different versions to make the open array present at the appropriate angle for the region in which it is used. In some embodiments, adjustable swinging braces and/or adjustable angled legs may make it possible to alter the angle for more efficiency year-round. For exemplary purposes and without limitation, the embodiments detailed herein are set at 32°, which is the angle selected for use in North Texas.

In other embodiments, the foldable array of the present invention may be a fixed mount type. In these embodiments, the wheels and swinging brace are replaced with a framework that can be anchored to the ground. The advantage of this system over other permanent systems is that it can be folded up and secured in the event of hail. Hail is the single most dangerous condition for solar panels, and is typically the only aspect that is not guaranteed from solar panel manufacturers. Several of these arrays placed in a checkerboard layout could provide a much larger output of energy. An added benefit is the ability to fold up the arrays and make the ground beneath more accessible for mowing and ground maintenance.

Although most of the illustrated embodiments are designed for four solar panels, it is to be appreciated that in other embodiments, one, two or three panel systems may also be provided. For example, and without limitation, a four-panel system may be reduced to a two-panel system by leaving off the outer two arms of the support frame. In that case, the angled legs could also be left off, but the cart and swinging brace would remain the same. The inner panel support arms would be modified to eliminate the 180° hinges but add structures to allow for the use of the front swivel casters. This would reduce the weight by approximately half but also the electrical output of the array would be reduced by approximately half.

It is therefore an object of the present invention to provide portable support assemblies for intermediate sized solar panel arrays that are easy to transport and capable of supporting multiple large solar panels to provide more robust power to a number of items.

It is also an object of the present invention to provide methods of moving and supporting arrays of large solar panels in order to deploy them in remote locations or for domestic emergency use and provide significantly more power than would otherwise be available.

It is also an object of the present invention to provide methods and apparatus for transporting and deploying multiple arrays of large solar panels that are easy to assemble, easy transport, easy to adjust, easy to disassemble and which provide compact storage.

It is also an object of the present invention to provide portable solar panel support and deployment systems for containing a nominal group of four solar panels that can be easily moved about and quickly be folded closed or unfolded open so as to make the solar panels present at a fixed angle to the sun It is also an object of the present invention to provide portable solar panel support and deployment systems using a unique integrated hinge system that creates a strong and positive stop at 0, 90, or 180 degrees and also allows an offset that compliments the thickness of the solar panels attached thereto.

It is also an object of the present invention to provide portable solar panel support and deployment systems having an integrated control arm system that forces the movable angled support leg to deploy at 90 degrees to the earth to quickly assume the weight of the open solar panels.

It is also an object of the present invention to provide portable solar panel support and deployment systems that use a swinging arm brace and positive stop against the dual-purpose handle to quickly assume the weight of the initial action of tilting of the embodiment to present at the nominal angle to the sun as prescribed by the current iteration of the embodiment.

It is also an object of the present invention to provide portable solar panel support and deployment systems having a wheel system that, when in the folded-up attitude, allows easy movement to the deployment location in a similar fashion to a shopping cart.

It is also an object of the present invention to provide portable solar panel support and deployment systems in which the substitution of just three parts can allow a different fixed nominal angle to the sun for use in significantly different geographic regions of the country.

It is also an object of the present invention to provide portable solar panel support and deployment systems that can easily be modified or used as-is to support different sized solar panels as needed by the end user.

It is also an object of the present invention to provide portable solar panel support and deployment systems that can be reduced in stature to support fewer panels as needed while maintaining the same basic properties of the full embodiment.

It is also an object of the present invention to provide portable solar panel support and deployment systems that can be used with an alternate base unit to perform the same foldable solar panel functions in a fixed environment.

Additional objects of the invention will be apparent from the detailed descriptions and the claims herein.

DETAILED DESCRIPTION

Figure 3:
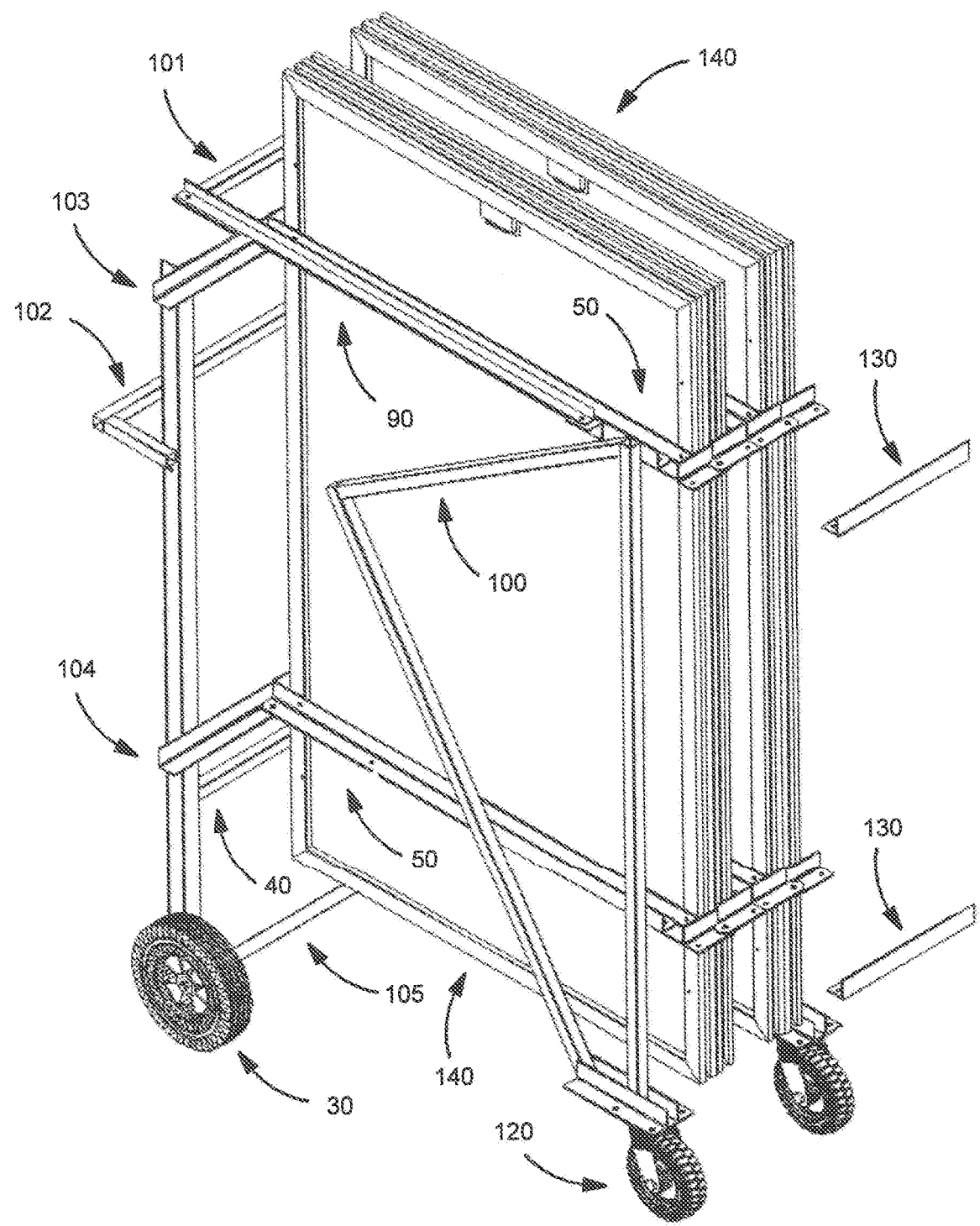
FIG. 3 is a perspective view of a folded array of an embodiment of the invention in a collapsed condition with solar panels.
Figure 12:
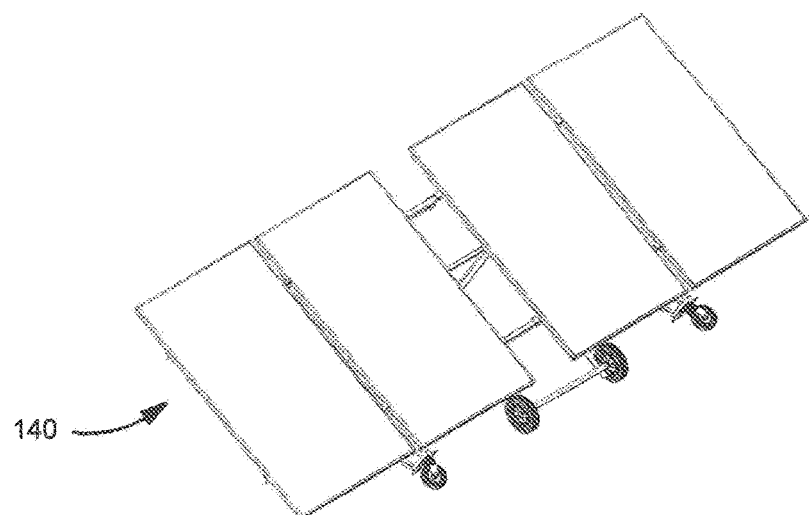
FIG. 12 shows a perspective view of an embodiment of the invention with the folded array fully open—with solar panels installed.

Referring to the drawings wherein like reference characters designate like or corresponding parts throughout the several views, and referring particularly to the exemplary embodiments of FIGS. 3 and 12 (full mobile embodiment), 18 and 21 (two-panel mobile embodiment), 22 and 25 (stationary embodiment), it is seen that in these illustrated embodiments, a support frame 10 (mobile embodiment) or 11 (stationary embodiment) is provided having two additional support members or angled legs 100, 110 (mobile embodiment) or 170 and 180 (stationary embodiment), and two horizontal structural support groups 50, 70 (inner pair), and 60, 80 (outer pair). These support members may be made of iron, steel, aluminum or other sturdy metal.

Figure 1:
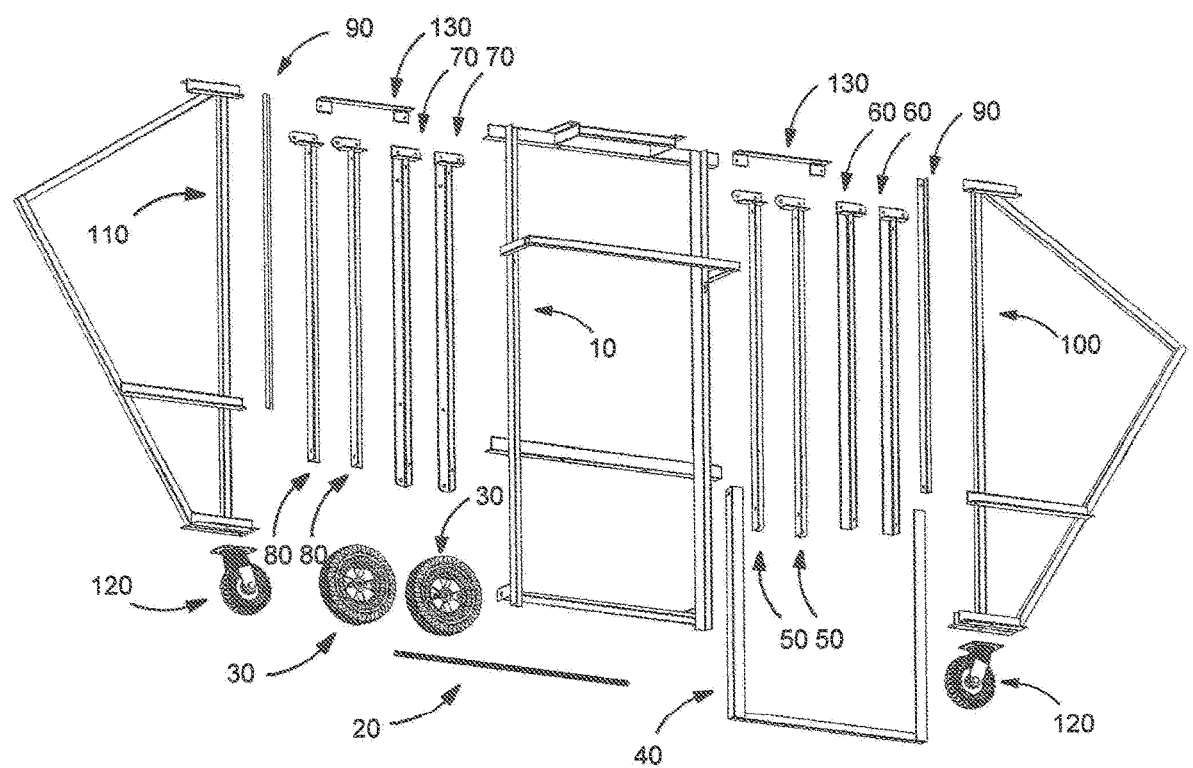
FIG. 1 is a list of component parts for an embodiment of the invention.

FIG. 1 discloses the following component parts: main cart 10; main cart axle 20; exemplary ten inch (10") wheels 30; swinging brace 40; right hand (RH) inner panel arms 50; RH outer panel arms 60; left hand (LH) inner panel arms 70; LH outer panel arms 80; angled leg control arm 90; RH angled leg 100; LH angled leg 110; exemplary six inch (6") caster 120; and storage braces 130. The view of these components in the exemplary embodiment of (FIG. 1) are based on the view of an operator standing behind the cart.

Figure 2:
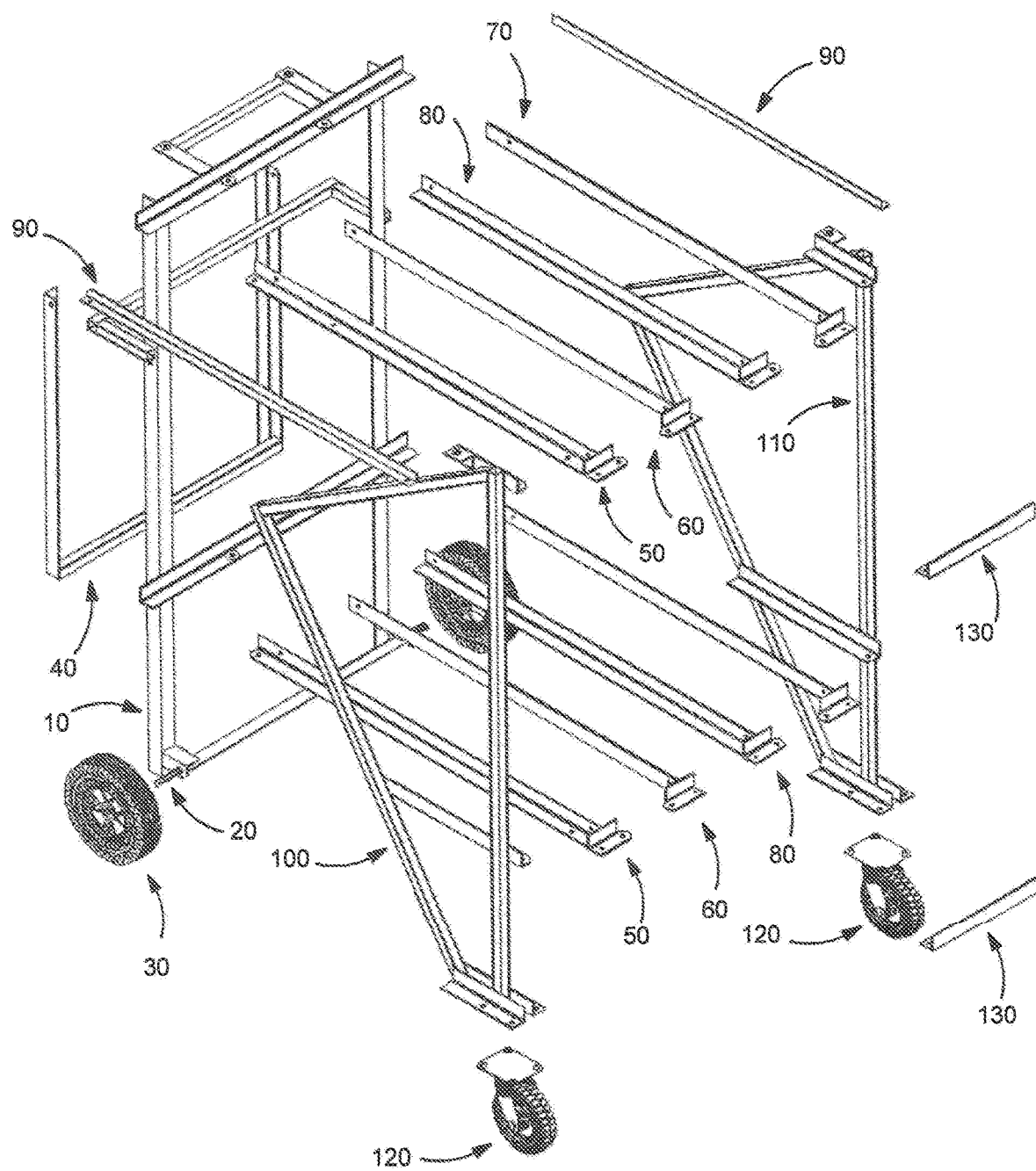
FIG. 2 is an exploded view of a folded array of an embodiment of the invention.
Figure 14:
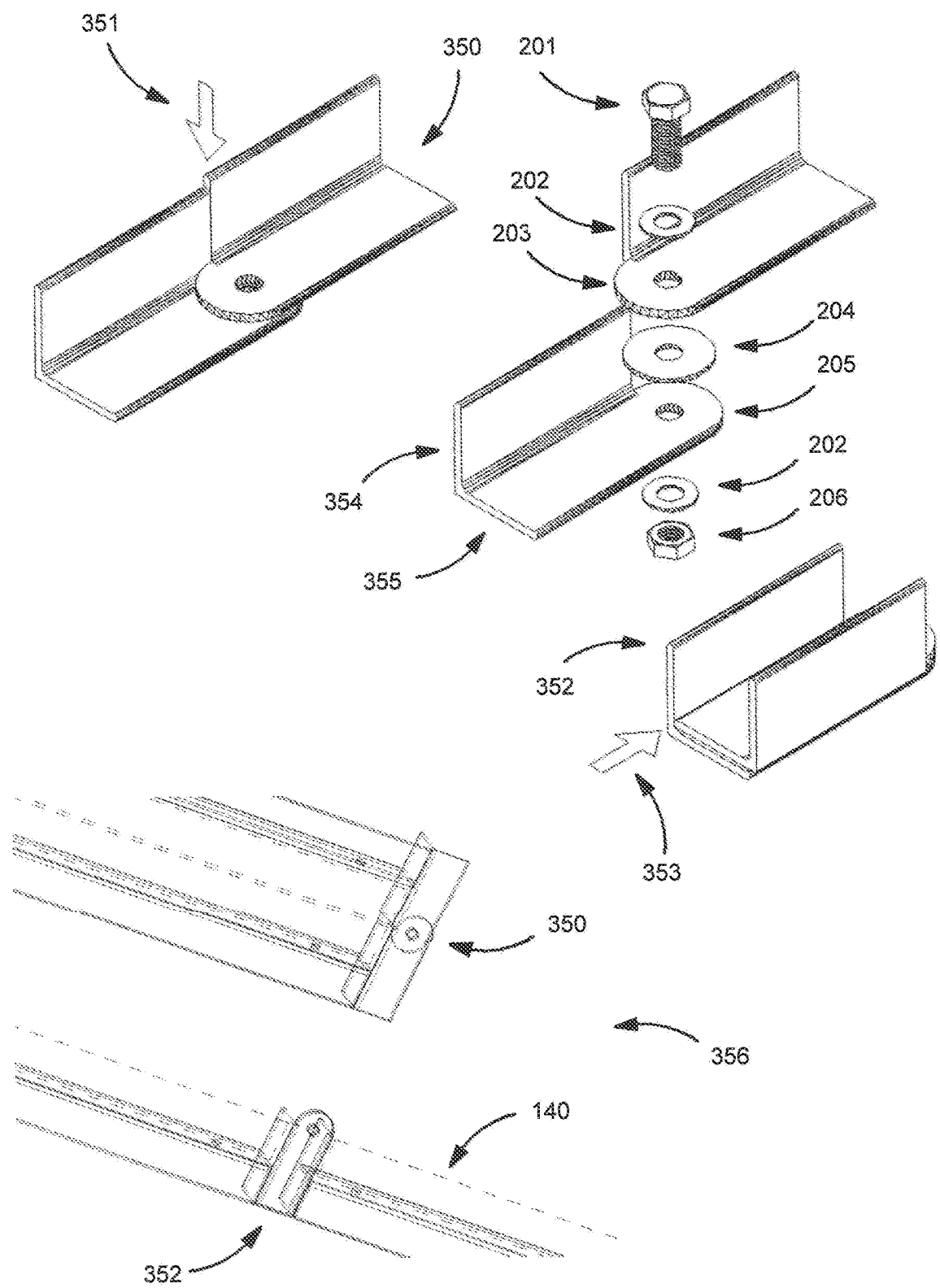
FIG. 14 is an exploded detail view of a proprietary 180° integrated hinge of an embodiment of the invention.
Figure 15:
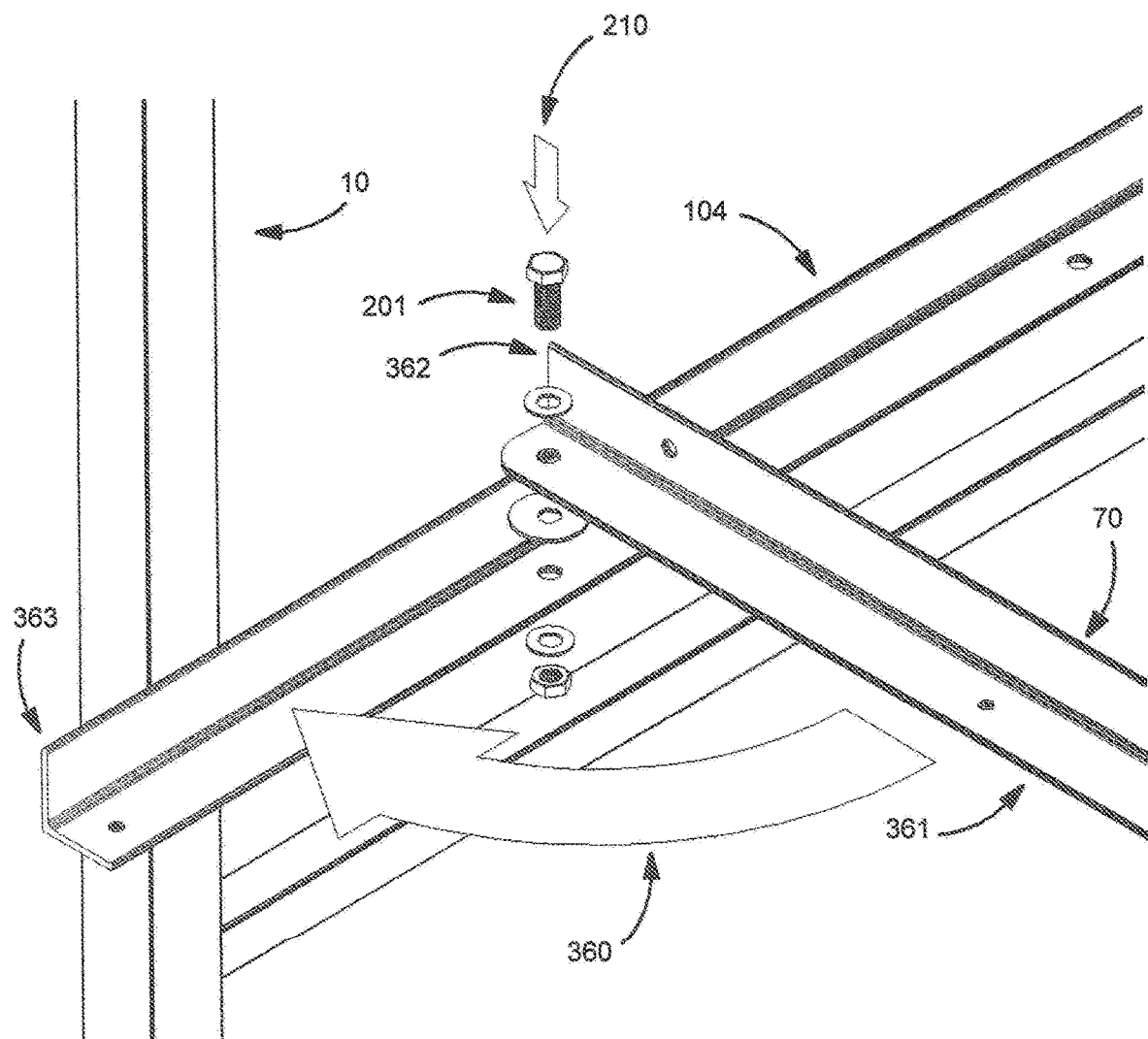
FIG. 15 is an exploded detail view of a 90° integrated hinge of an embodiment of the invention.

FIG. 2 is an exploded view of an example of a folded array with relative position of the components. In this embodiment, the cart 10 attaches to the upper and lower inner panel arms 50 & 70 by way of 90° hinges (FIG. 15). The angled legs 100 & 110 attach to the inner panel arms by way of upper and lower 90° hinges and are directed by the control arms 90. The outer panel arms 60 & 80 attach to the inner panel arms by way of 180° integrated hinges (FIG. 14). The wheels 30 mount to the cart using an axle 20 which may be protected by an axle guard mounted to the cart 10. The swivel casters 120 attach to the bottom of the angled legs 100 & 110.

Figure 5:
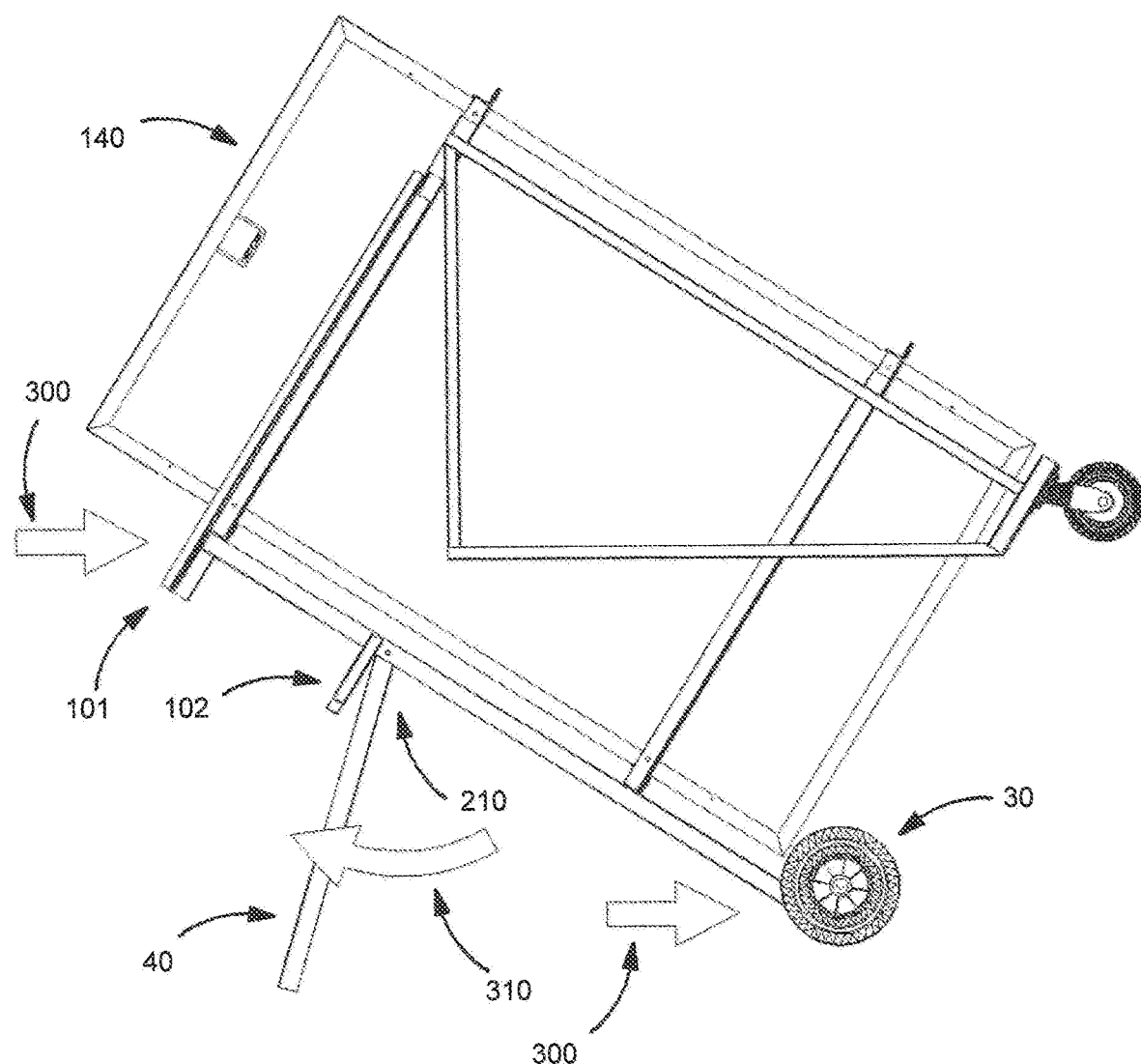
FIG. 5 illustrates a first action of deployment of an embodiment of the invention—tilting back.
Figure 16:
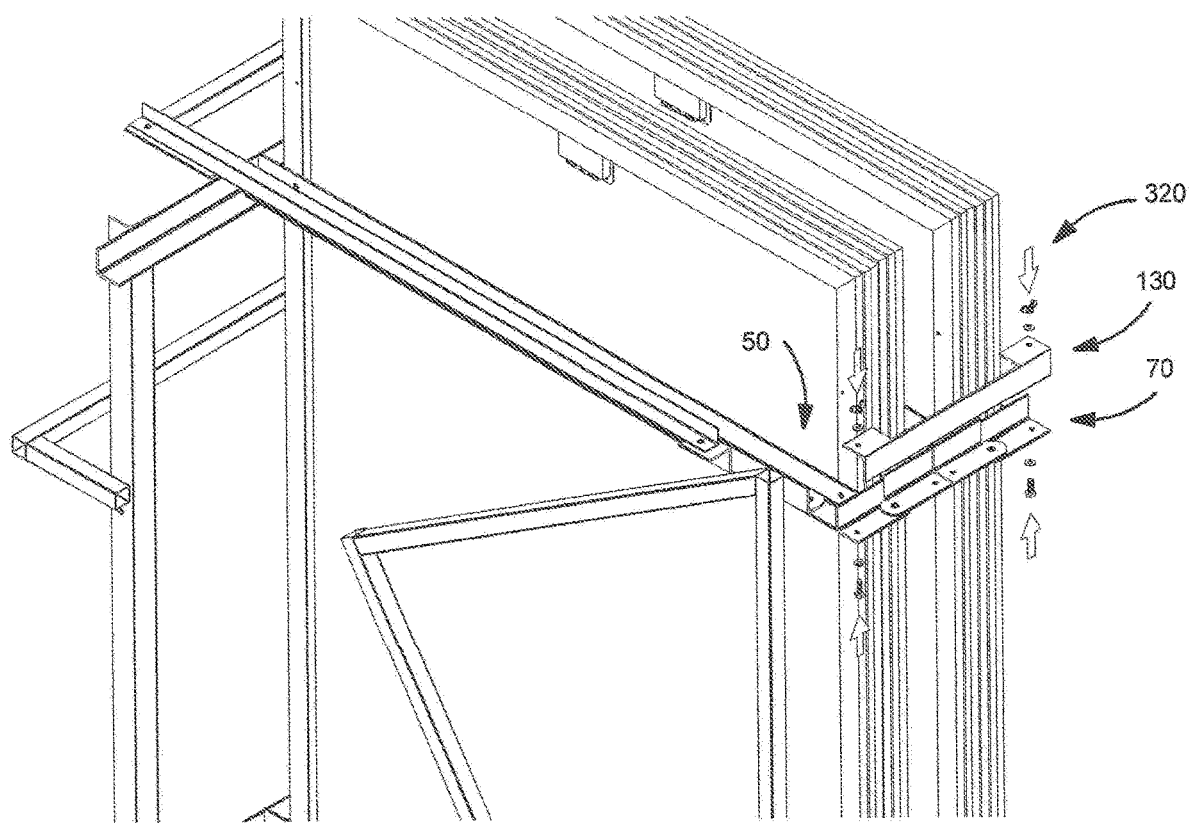
FIG. 16 is a perspective view showing the location of storage braces of an embodiment of the invention.

FIG. 3 is an example of a folded array in the storage and transport position (collapsed). This exemplary cart features an upper handle 101 and a lower handle 102 that is used to steer the cart. The folded solar panels 140 are bolted directly to the inner panel arms 50 which are in turn mounted to the upper 103 and lower 104 cart arms by use of 90° hinges (FIG. 15). The axle may be encased in a protective section of square steel tubing 105 which is also the foot rest for the first action of deployment described further in (FIG. 5). From the angle shown in FIG. 3, the inner panel arms 50 can be seen but the outer arms are folded inside the center part of the folded cart system. The upper and lower panel arms now move as a group being coupled by the solar panel. This is true of each of the four pairs of upper and lower panel arms. The RH angled leg 100 is in the pinned position (FIG. 7) and further held in place by the control arm 90. The cart is designed to be used with large wheels 30 (e.g., 10" fixed rear wheels) and rotating front casters 120 (e.g., 6" casters) for easy movement. The storage braces 130 have been removed in this view to better show the front detail of the cart and are detailed further in (FIG. 16).

Figure 4:
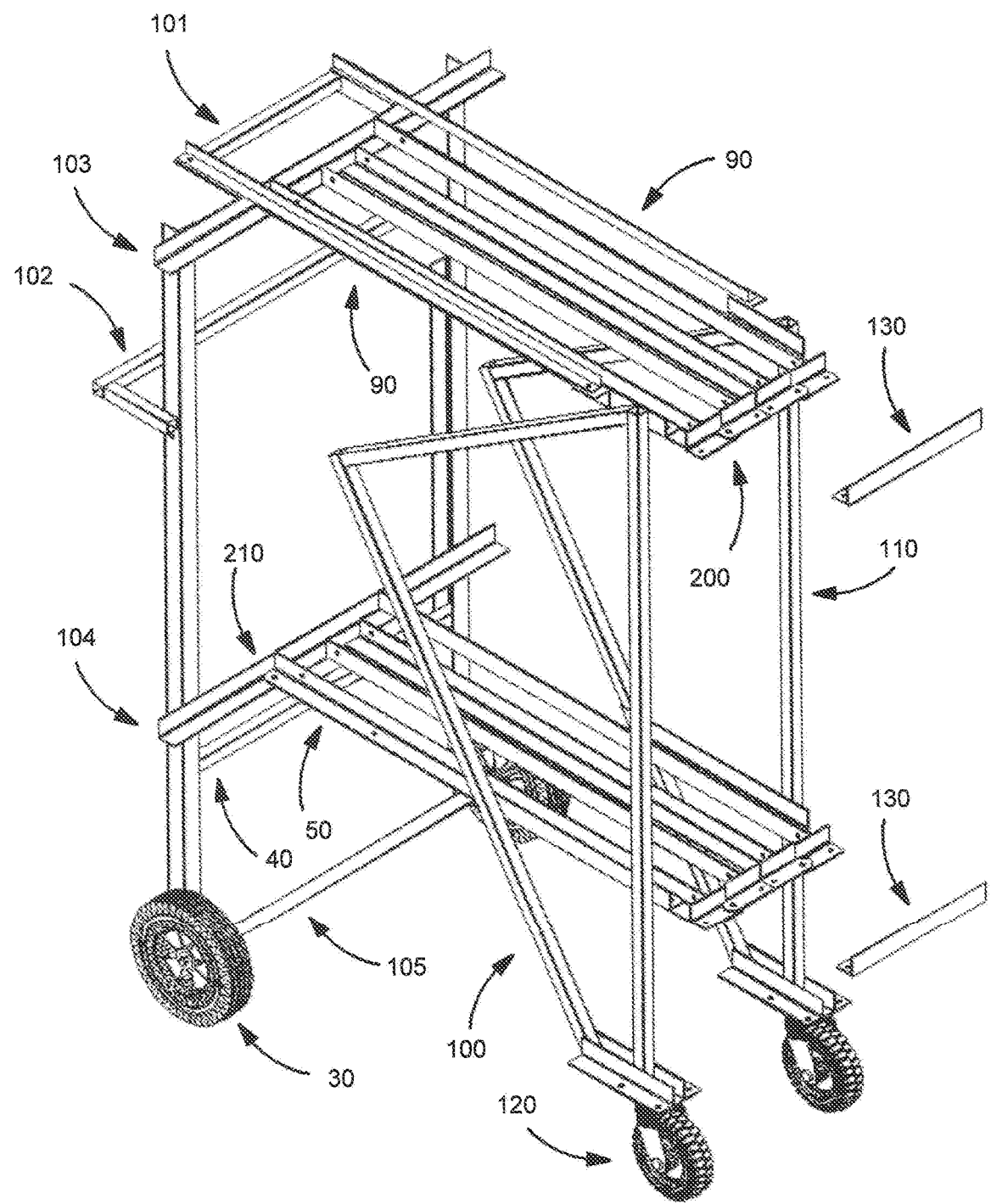
FIG. 4 is a perspective view of a folded array of an embodiment of the in a collapsed condition invention without solar panels

FIG. 4 is an example of a folded array in a collapsed position without solar panels to better see the relationship of the frame components. The upper cart handle 101, lower cart handle 102 are shown. Upper 103 and lower 104 cart arms hold the inner panel arms 50 by way of 90° hinges 210 (see also FIG. 15). These arms are coupled to the outer panel arms using 180° hinges 200 (see also FIG. 14). Both angled leg control arms 90 are now visible. They direct the motion of the angled legs 100 & 110 during deployment. The large rear wheels 30 and axle (not visible) may be set at, for example and without limitation, 32.5" wide overall to navigate typical 36" doorways, although other suitable distances may be used. The front wheels 120 may be closer together to minimize the overall footprint for easier storage. Storage braces 130 are shown removed.

FIG. 5 shows the first action of deployment. The upper handle 101 is used to pull the array backward and is chosen to allow greater leverage than the lower handle while the operator places a foot on the axle brace (located between the wheels 30) and the swinging brace 40 falls backward (310) to come in contact with the ground without the operator having to position it. Once in contact with the ground, the cart is pushed forward (300) to fully engage (310) the swinging brace 40 against the lower cart handle 102.

Figure 6:
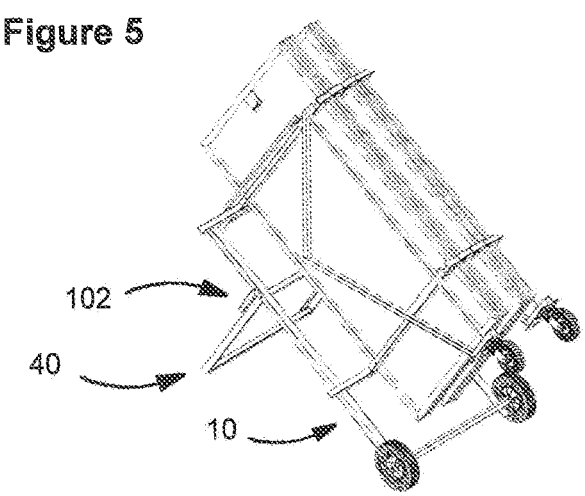
FIG. 6 illustrates the completed first action of FIG. 5.

FIG. 6 shows the position of the cart 10 with the swinging brace 40 fully engaged against the lower cart handle 102.

Figure 7:
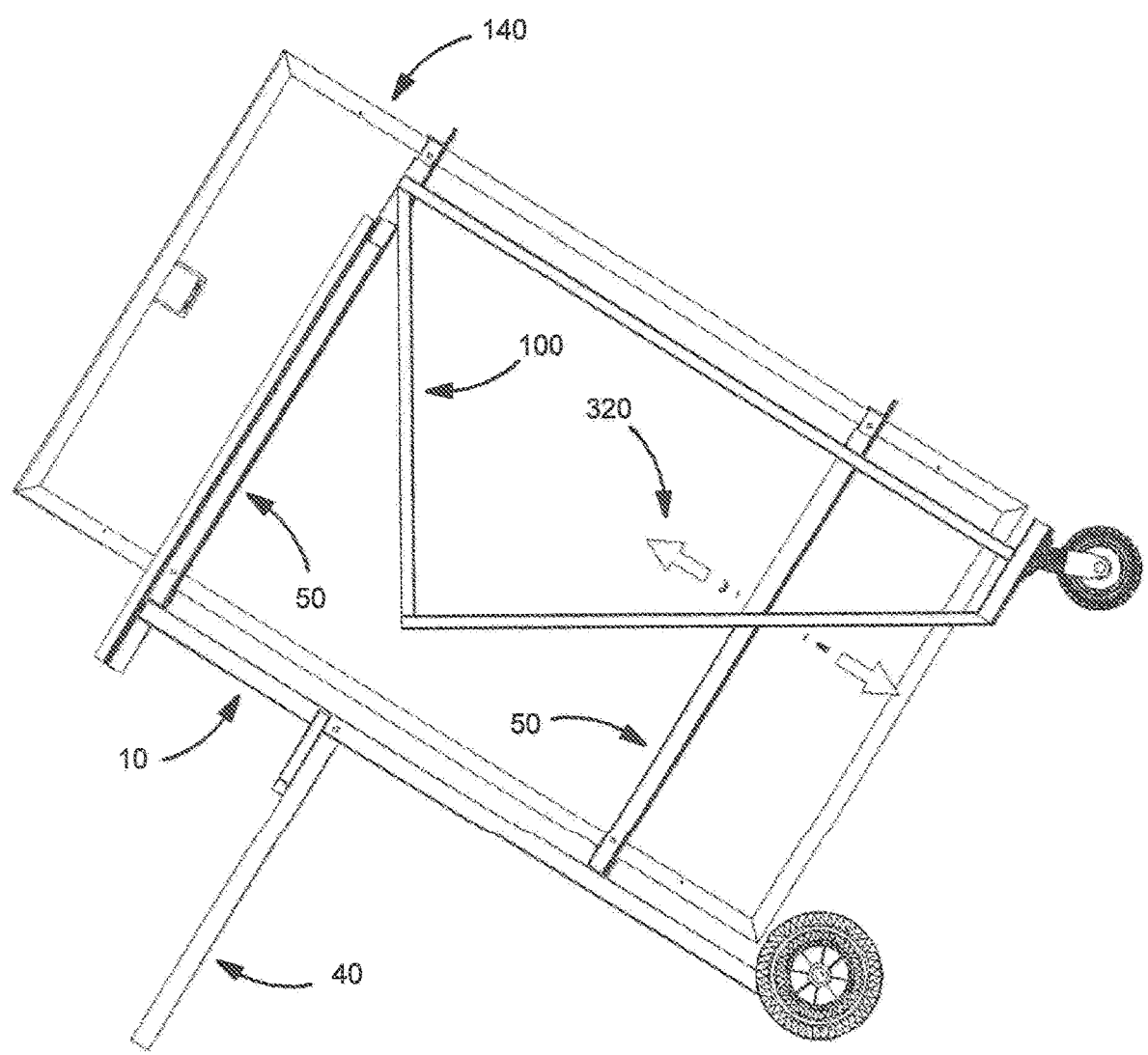
FIG. 7 shows location of the angled leg pins for removal in an embodiment of the invention.

FIG. 7 shows the location of the wing pins (320) in an exemplary embodiment. These may be, for example and without limitation, ¼-20×1" bolts which may use wing nuts that go through holes in the angled arm 100 and the inner panel arm 50. The cart 10 with solar panels 140 is now resting on the swinging brace 40 in order to be stable for the deployment of the panel wings.

Figure 8:
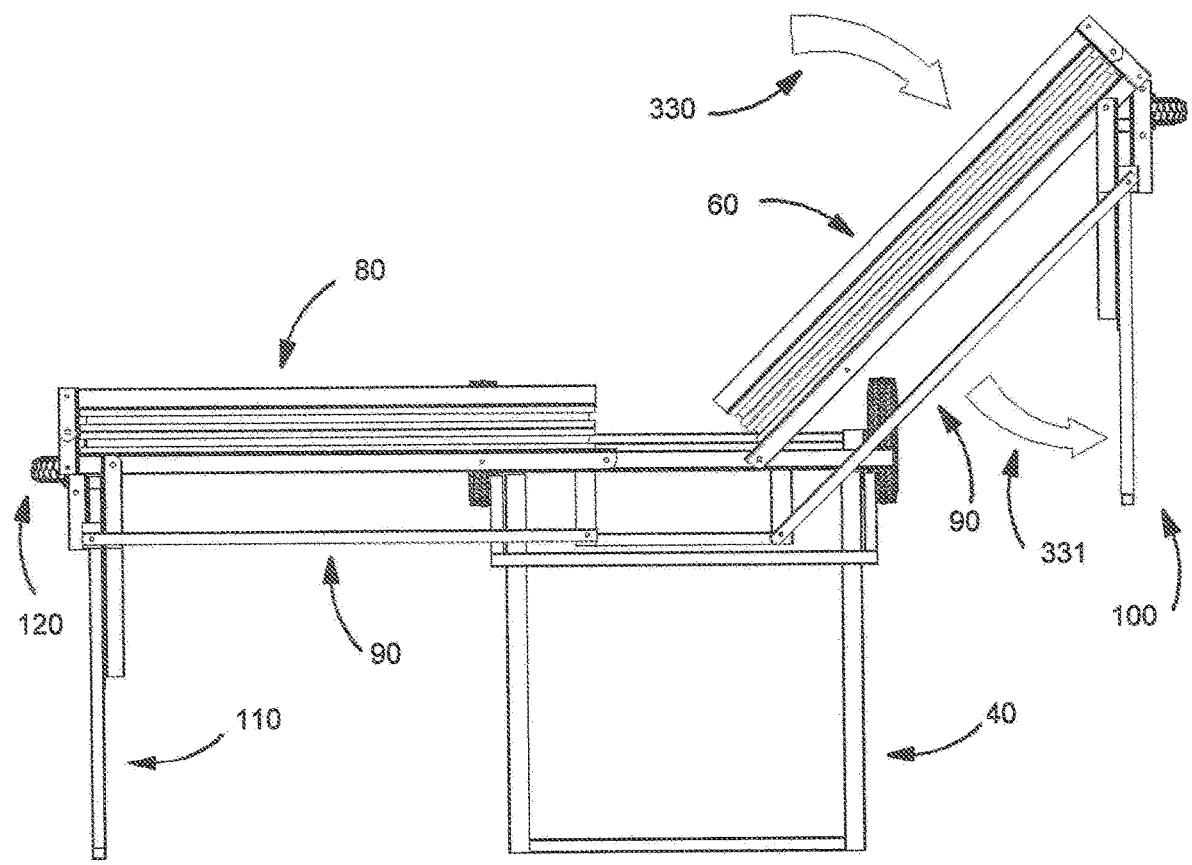
FIG. 8 presents a top view of a second action of deployment of an embodiment of the invention—unfolding an inner wing.

FIG. 8 is from the view atop the axis of an example of a cart and demonstrates the action of the control arm 90 to keep the angled leg 100 in alignment with the cart (331) as it is lowered (330) to the ground. The LH angled arm 110 is shown already in contact to the ground. Note that the casters 120 may be rotated 90° to keep from blocking the angled legs from lying flat on the ground. The outer panel arms 60 & 80 are now on top. The action of control arms 90 in keeping angled legs 100 and 101 in alignment with the cart is critical. This is because the solar panels are heavy, and once the deployment begins, the force of gravity may cause them to move rapidly as they are unfolded. It is therefore important for support legs 100 and 101 to remain aligned with the cart (and parallel with each other) so that they are immediately available to provide ground support for the solar panels when they are fully opened, as shown with reference to leg 110 of FIG. 8. It is to be appreciated that while each solar panel is being moved from a generally vertical position (as shown in FIG. 6) to a generally horizontal position (as shown in FIG. 10), legs 100 and 110 remain parallel to each other, through the action of control arms 90.

Figure 9:
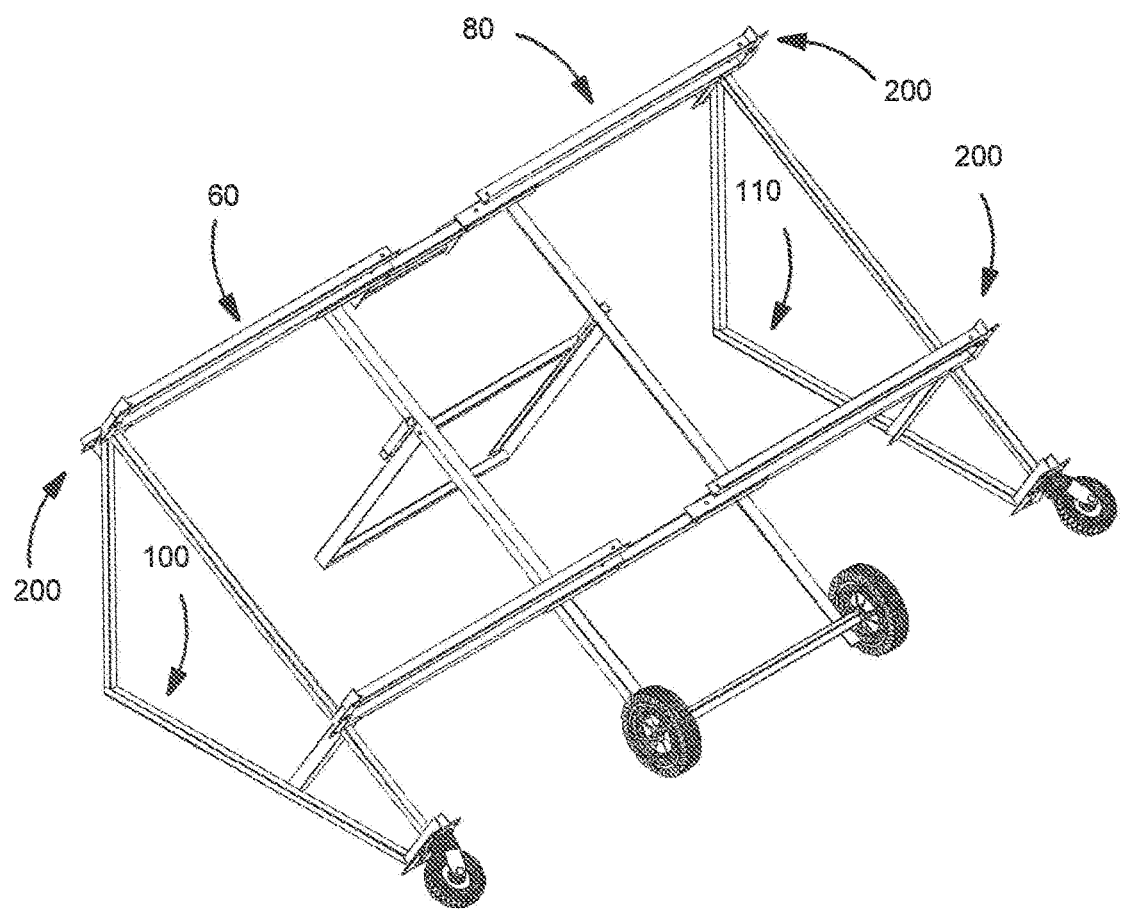
FIG. 9 shows a perspective view of an embodiment of the invention with both inner wings open—without solar panels.

FIG. 9 shows an example of two inner wings in the open position with the solar panels removed for clarity. The outer panel arms 60 & 80 are now on top. The angled legs 100 & 110 are flat on the ground. The outer panel arms are still held in the closed position by the 180° hinges 200.

Figure 10:
FIG. 10 shows a perspective view of an embodiment of the invention with both inner wings open—with solar panels installed.

FIG. 10 is the same as (FIG. 9) except with the solar panels 140 in place.

Figure 11:
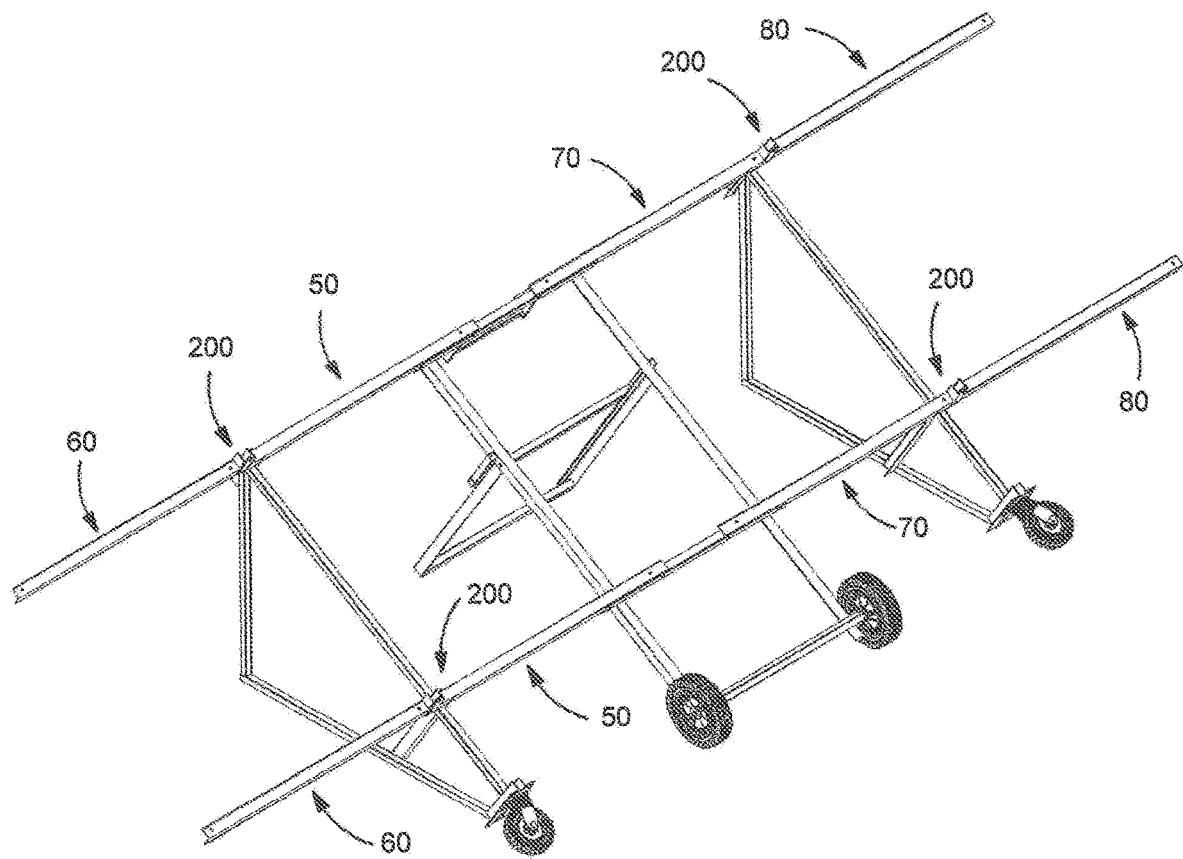
FIG. 11 presents the third action of deployment an embodiment of the invention—a perspective view of the folded array fully open, without solar panels.

FIG. 11 is step three of the deployment and is a skeletal view of the system fully deployed. The inner panel arms 50 & 70 are coupled to the outer panel arms 60 & 80 by way of the 180° integrated hinges 200. The operator is encouraged to lift the outer panels open by grasping the panel arms and not by the solar panels directly.

FIG. 12 is the same as (FIG. 11) except with the solar panels 140 in place.

Figure 13:
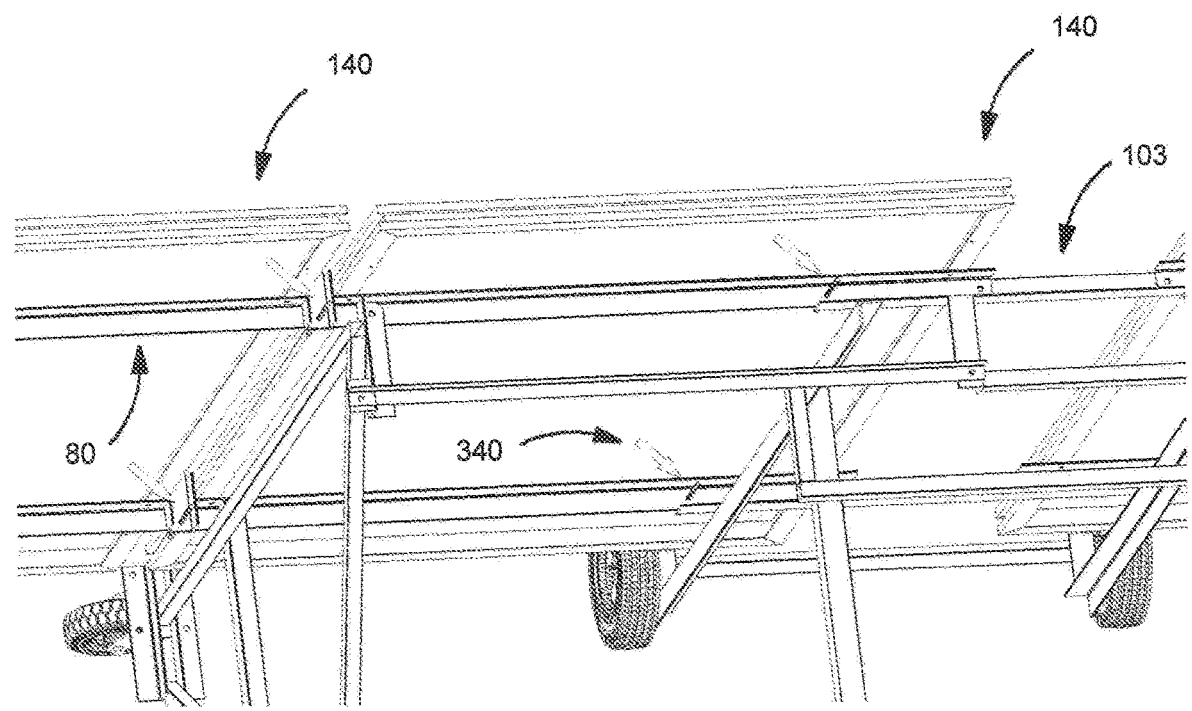
FIG. 13 is a rear perspective view of an embodiment of the invention showing the location of stabilizing pins.

FIG. 13 is a rear view of an example of an open system showing the locations (340) of the stabilizing pins behind the solar panels 140. These may be sets of ¼-20 machine hardware and may use washers and wing nuts. These are located on the 180° integrated hinges and at the outer ends of the panel cart arms 103. The pins are recommended to lock the system in place so it has greater resistance to wind but are not required for the system to function.

FIG. 14 is a detail of an example of a 180° proprietary panel hinges which may be integrated into the unit. The novel feature is the ability to create a positive stop (351) in the closed (350) position. Another positive stop (353) occurs in the open (352) position. The extended ends also allow for offset attachment of the panel arms so that the solar panels have sufficient clearance to close face-to-face. Refer to the insert (356) of (FIG. 14) as well as (FIG. 3) to better appreciate this relationship. The insert shows an x-ray view of the hinge with the panel brace attached where the dotted lines represent the immediate cross section of the solar panels 140. The hardware stack for the integrated hinge may include one ⅜-16×1" stainless steel bolt 201, two ⅜" stainless steel washers 202, one stainless steel fender washer 204 to provide smoother action and separate the halves of the hinge 203 & 205 and one ⅜-16 stainless steel lock nut 206 with nylon insert.

Each 180° hinge 200 includes a pair of flanges, each flange having an L-shaped cross section. Each flange includes a flat bottom (horizontal) edge (355) having a rounded extension thereon with an opening therein for receiving a bolt, such as 201 which acts as a pivot. Each flange also includes a side (vertical) edge (354). The hinge may be closed (350) by rotating the flanges inward around pivot 201 until the vertical edges make contact with each other (351), stopping the opening movement. The hinge may be opened (352) by rotating the flanges in the opposite direction outward around pivot 201 until the horizontal edges make contact with each other (353), stopping the opening movement.

Refer to insert drawing (356) of FIG. 14 for a better understanding of the references to 'open' (352) and 'closed' (350) with respect to the panel arms and solar panels themselves 140 (dotted lines). These specialty hinges are key to the efficient deployment of the solar panels.

FIG. 15 is a detail of an example of a 90° hinge that may be integrated into the unit. It has the same hardware stack as the 180° hinge detailed in (FIG. 14). This example is one of the RH inner panel arms 70 where it attaches to the cart arm 104. This type of hinge has a positive stop at 90° (360).

Each 90° hinge 210 includes a movable flange 70 having an L-shaped cross section with a flat bottom (horizontal) edge (361) having a rounded extension thereon with an opening therein for receiving a bolt, such as 201, which acts as a pivot. Flange 70 is rotatably mounted to cross member 104 at 210. The flange 70 also includes a side (vertical) edge (362). The hinge 210 may be opened by rotating the flange 70 outward around pivot 210 until the vertical edge (362) makes contact with cross member 104, stopping the movement. The hinge 210 may be closed by rotating (360) flange 70 in the opposite direction around pivot 210 until the horizontal edge makes contact with the horizontal edge (363) of cross member 104, stopping the opening movement.

In like manner as the description of the 180° hinge in (FIG. 14), the references to 'open' and 'closed' are consistent with the ultimate attitude of the solar panels mounted thereto. Flange 70 in FIG. 15 is shown in a 'closed' position; rotating it outward in the direction shown by the arrow (360) will move it to an 'open' position.

FIG. 16 details how and where an example of the storage braces 130 attach. They sit on the corners of the inner panel arms 50 and may be attached using two sets of ¼-20 stainless steel hardware with wing nuts on each (320). Once removed, the hardware may be used as the stabilizing pins for the panel arms FIG. 13.

Figure 17:
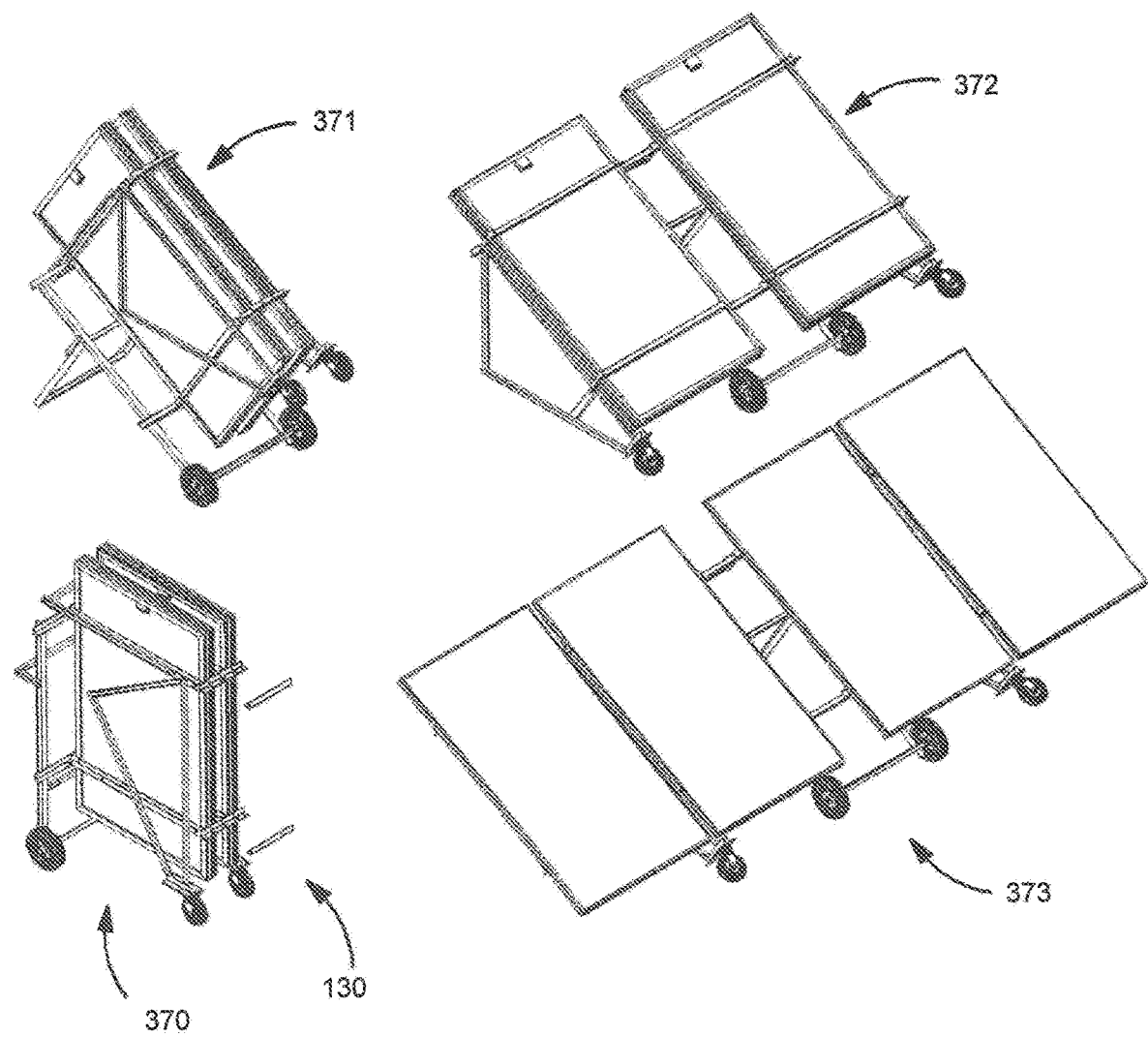
FIG. 17 shows four steps of deployment of an embodiment of the invention.

FIG. 17 illustrates the steps to deploy an embodiment of the invention. In order to stay on a single page, the starting image is in the lower left corner and the steps are displayed in clockwise order. Image one (370) shows the folded array in the storage/transport position with the storage braces 130 removed. Image two is the first stage of deployment (371) and shows the still-folded array tilted back onto the swinging brace. This is where one of the diagonal leg pins would be removed and the inner panel group lowered to the ground (372) which is step two. After the second diagonal leg pin is removed, both inner panel groups would be lying flat on the ground (372) and the front casters rotated sideways to make the system lay flat. After pinning the inner panel arms as needed, the outer 'wing' panels are opened and pinned completing the third and final step of deployment (373).

Figure 18:
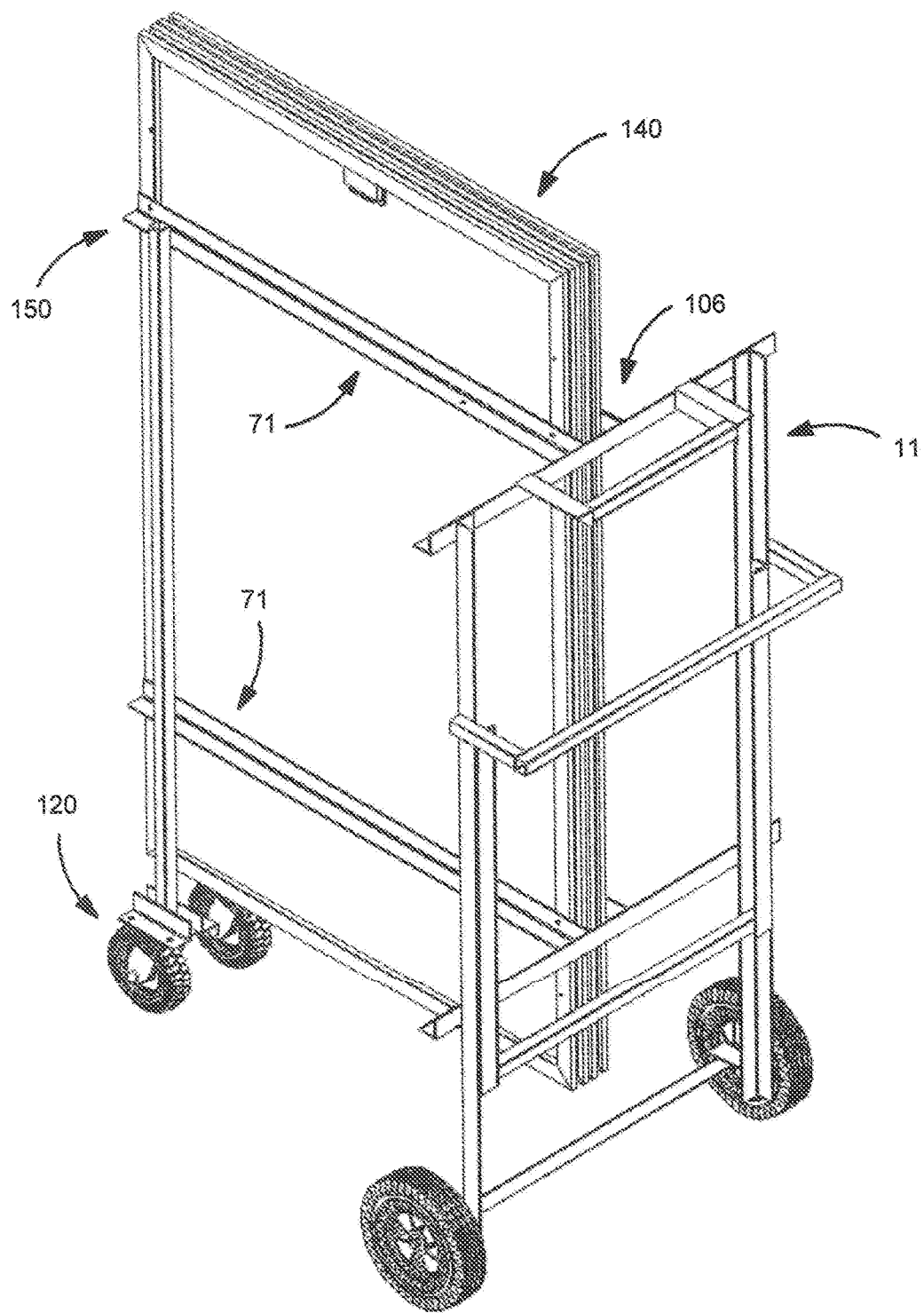
FIG. 18 is a perspective collapsed view of an alternative embodiment of the invention illustrating a folded 2-panel of array—with solar panels.
Figure 19:
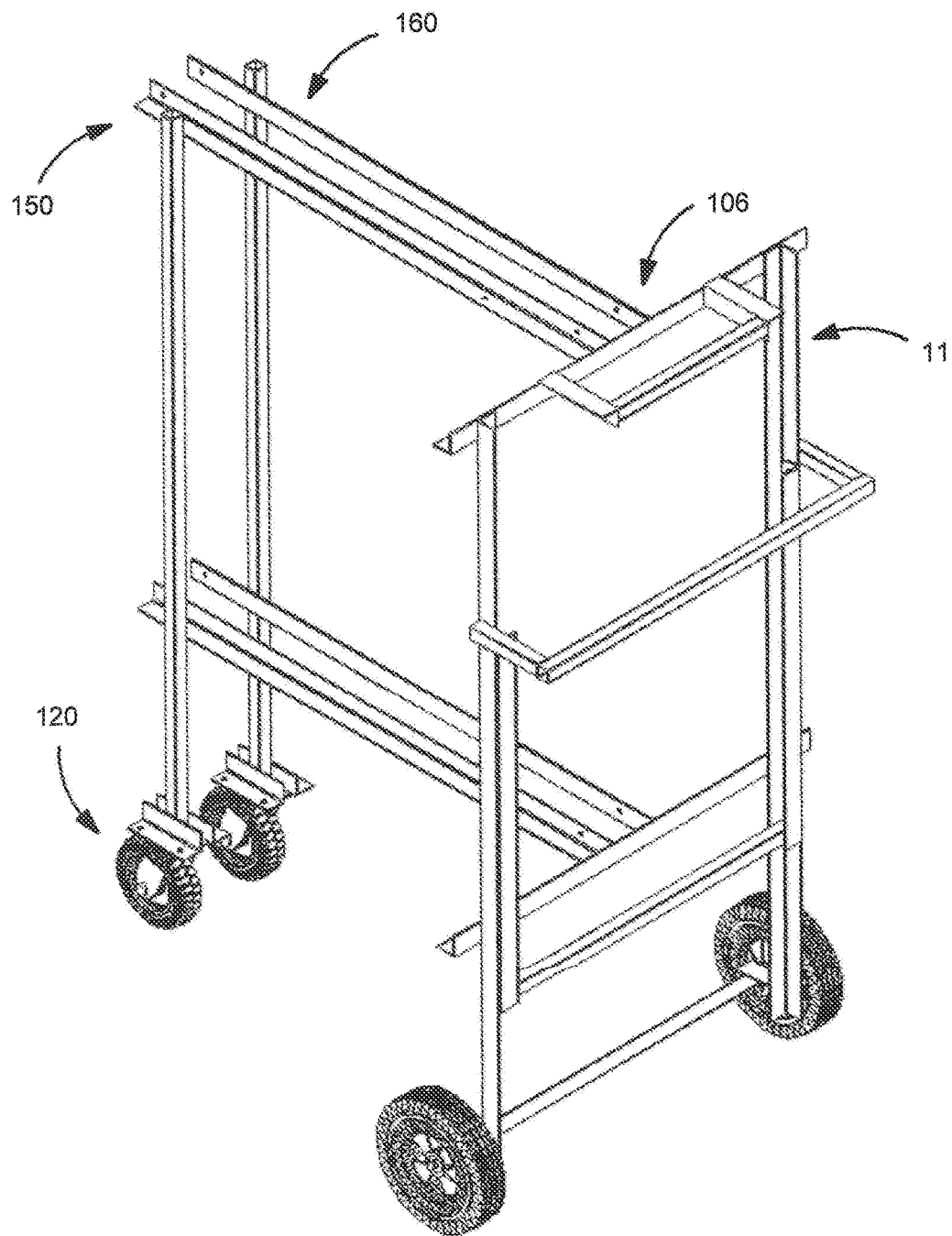
FIG. 19 is a perspective collapsed view of the 2-panel embodiment of FIG. 18—without solar panels.

FIG. 18 illustrates a smaller 2-panel embodiment of an example of a foldable array. This system uses the same cart design 11 except that the inner arm pivot points are closer together 106. Since the weight of the panels is half as much, the need for the angled legs is replaced with a simple pair of legs 150 that are welded to the upper and lower inner panel arms 71, but may still use the same casters 120 (e.g., 6") as before. The 180° integrated hinges are also eliminated as there are no outer panels to deploy. FIG. 19 is the same 2-panel embodiment of (FIG. 18) with the solar panels removed to see the complete frame. This has only four moving parts compared to the full 4-panel system. The upper and lower panel arms are combined with straight legs 150 & 160 to provide a place to mount the swivel casters 120. In this drawing it is now clearer how the panel cart 11 is modified 106 to keep the two solar panels closer together.

Figure 20:
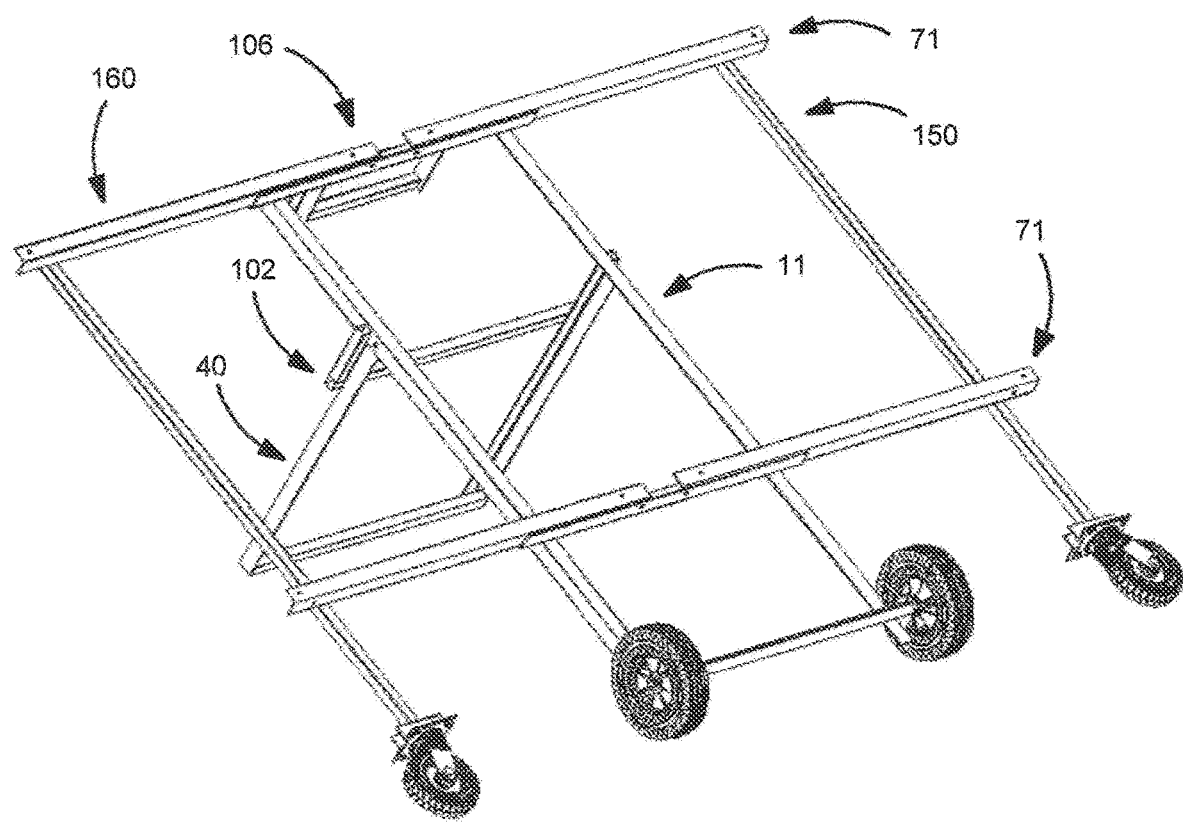
FIG. 20 is a perspective opened view of the 2-panel embodiment of FIG. 18—without solar panels.

FIG. 20 shows an example of a fully deployed 2-panel embodiment and the frame components. The inner panel arms 71 may both be welded to the caster posts to form combined panel support and caster legs 150 & 160. The swinging brace 40 rests against the lower cart handle 102 in the same fashion as the 4-panel system.

Figure 21:
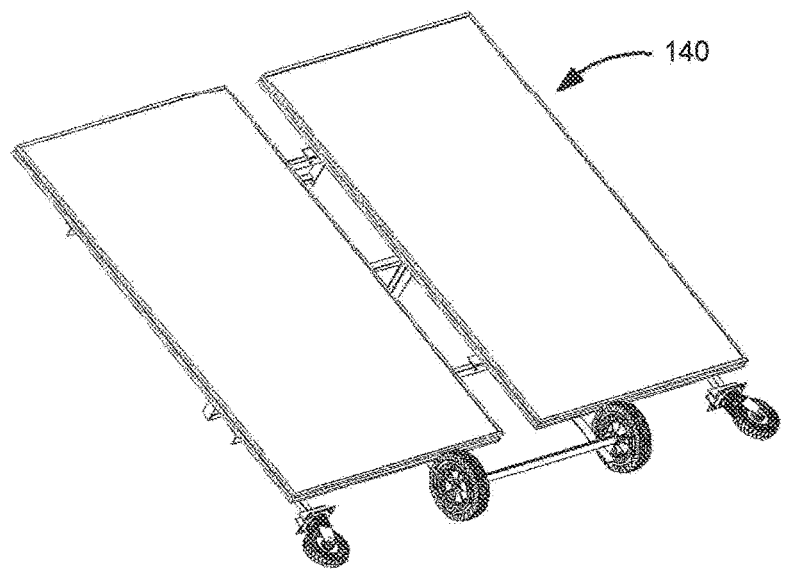
FIG. 21 is a perspective opened view of the 2-panel embodiment of FIG. 18—with solar panels installed.

FIG. 21 is the same as (FIG. 20) except that the solar panels 140 are shown in position.

Figure 22:
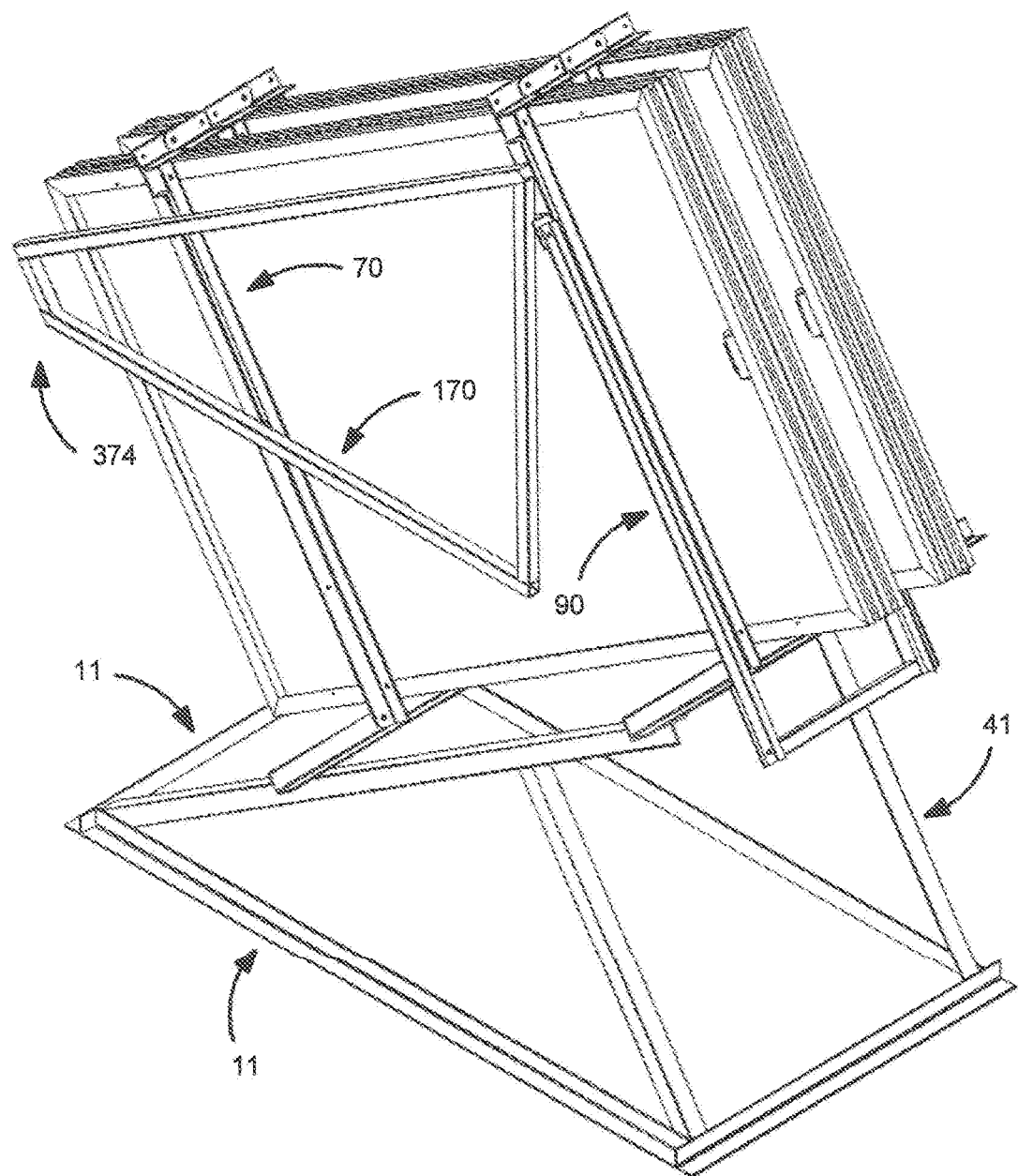
FIG. 22 is a perspective collapsed view of an alternative embodiment of the invention illustrating a stationary folded array.

FIG. 22 is an example of another embodiment where the cart is modified to have a fixed base 11 which now incorporates fixed braces 41 that replace the swinging arm from the portable versions. The entire folding system is the same as the original portable foldable array except the angled legs 170 have been shortened and the casters removed (374).

Figure 23:
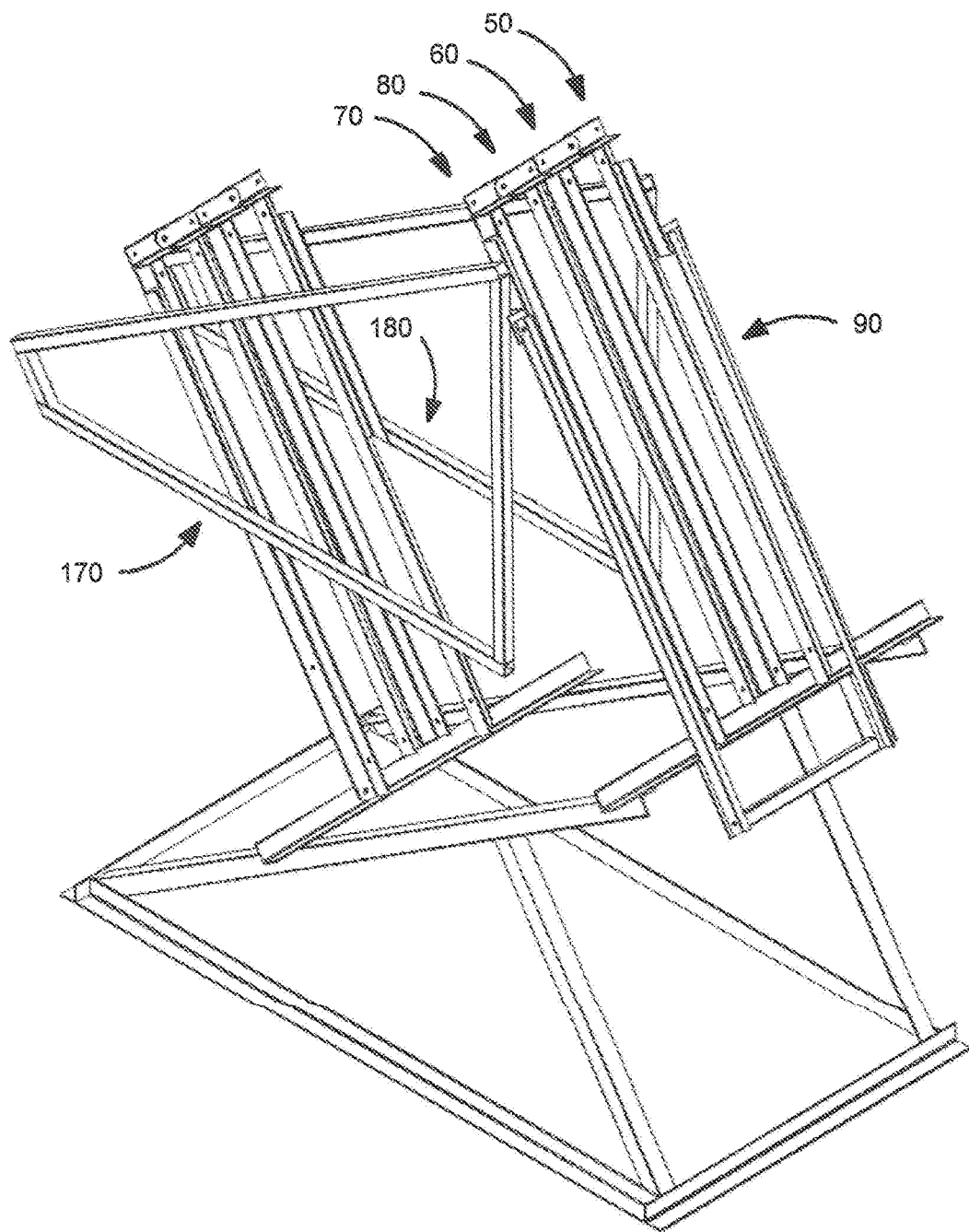
FIG. 23 shows the folded stationary embodiment of FIG. 22—without solar panels installed.

FIG. 23 is the same as (FIG. 22) except that the solar panels are removed to show the entire mechanism. The inner panel arms 50 & 70, outer panel arms 60 & 80 and control arms 90 are the same as the original foldable array. The angled legs 170 (and 180, not shown) operate the same way as the angled legs described in (FIG. 8) and having the same geometry as the original design except there is no longer any need for the casters and the overall length has been reduced for compactness.

Figure 24:
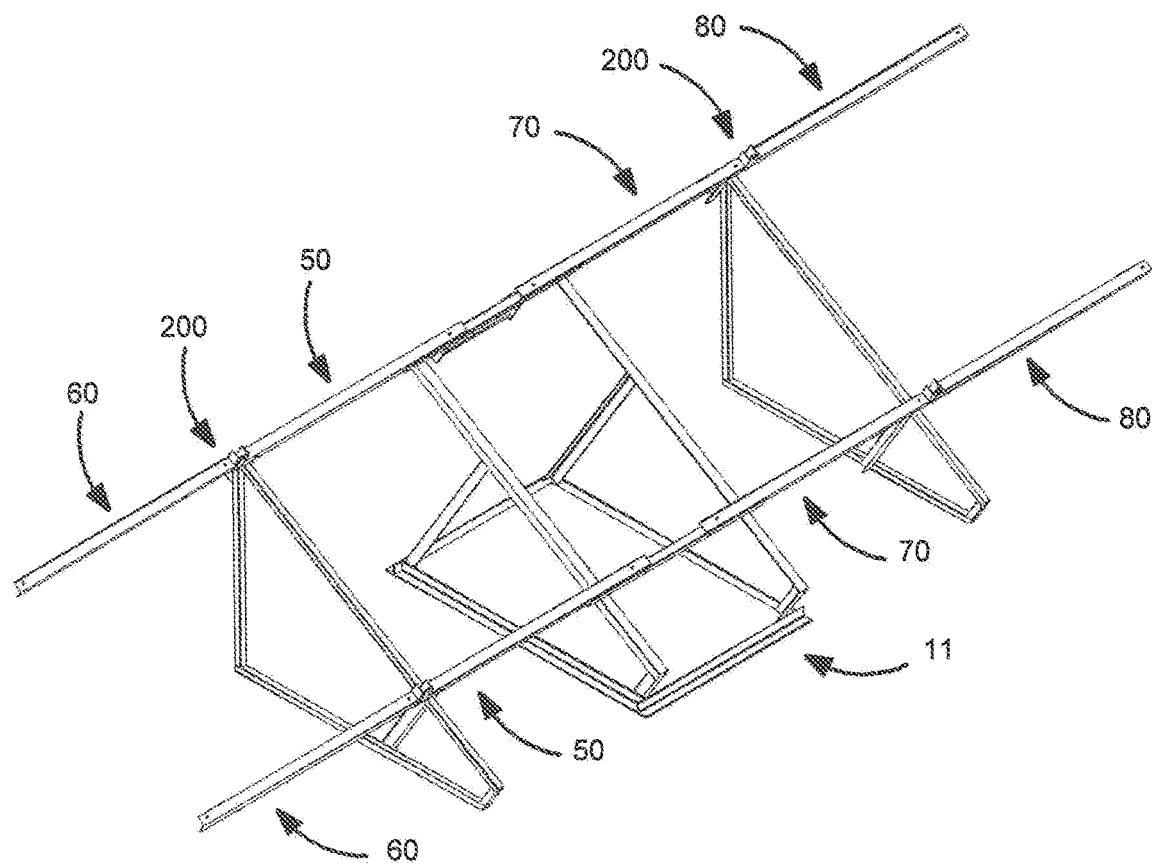
FIG. 24 shows the opened stationary embodiment of FIG. 22—without solar panels installed.

FIG. 24 is an example of a stationary folded array version in the open position without solar panels. The base 11 is like the portable cart except for a fixed framework and no wheels. The swinging brace has now been integrated and has become a fixed part of the frame that is secured to the ground. The inner panel arms 50 & 70 are still attached to the cart turned stationary base 11 with 90° hinges 210 and the outer panel arms 60 & 70 are still attached by the 180° hinges 200. It is easy to compare this framework with (FIG. 11) as all of the parts are generally the same except for the stationary base and truncated diagonal legs.

Figure 25:
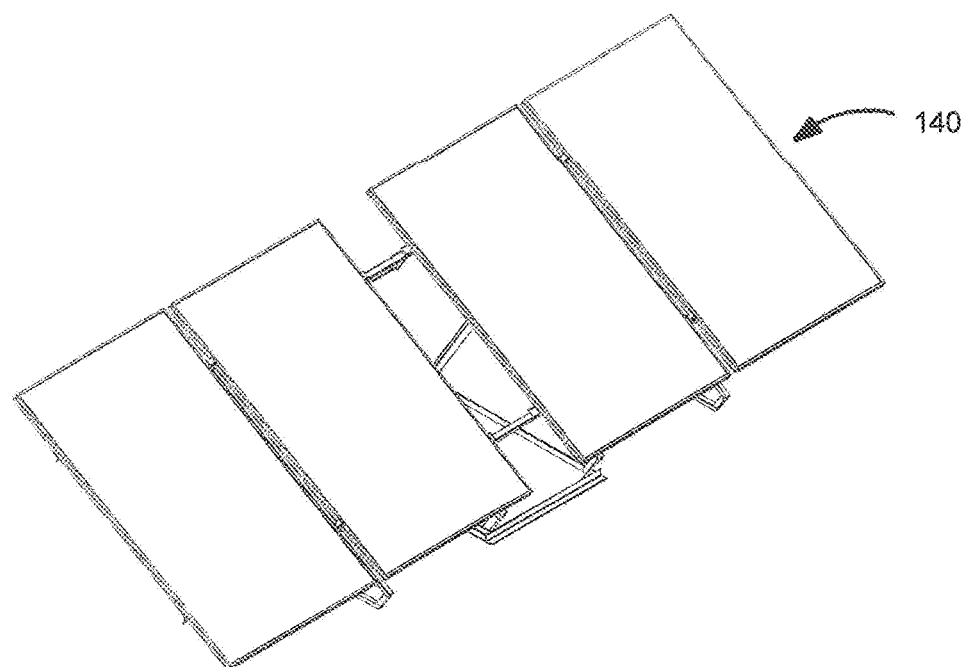
FIG. 25 shows the opened stationary embodiment of FIG. 22—with solar panels installed.

FIG. 25 shows an example of a stationary embodiment of a folded array in the fully deployed position with the solar panels 140 installed and compares to the portable folded array shown in FIG. 12.

Figure 26:
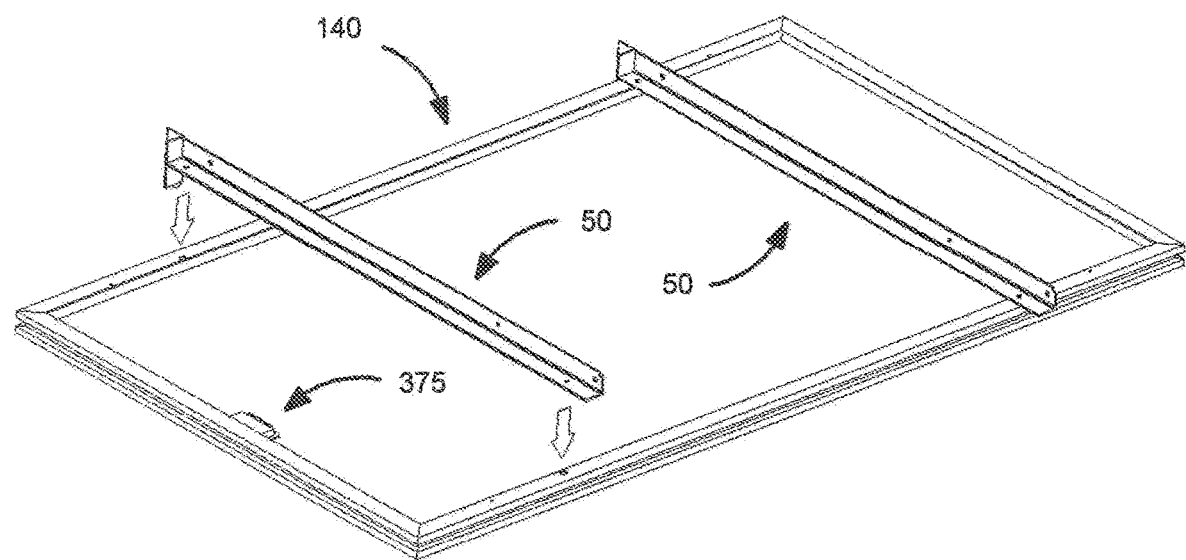
FIG. 26 is a rear view of an embodiment of the invention showing the orientation of a solar panel with respect to attaching the braces.

FIG. 26 shows the basic orientation of a solar panel 140 with respect to the attachment of the control arms. This example is the RH solar panel and RH inner control arms 50.

Figure 27:
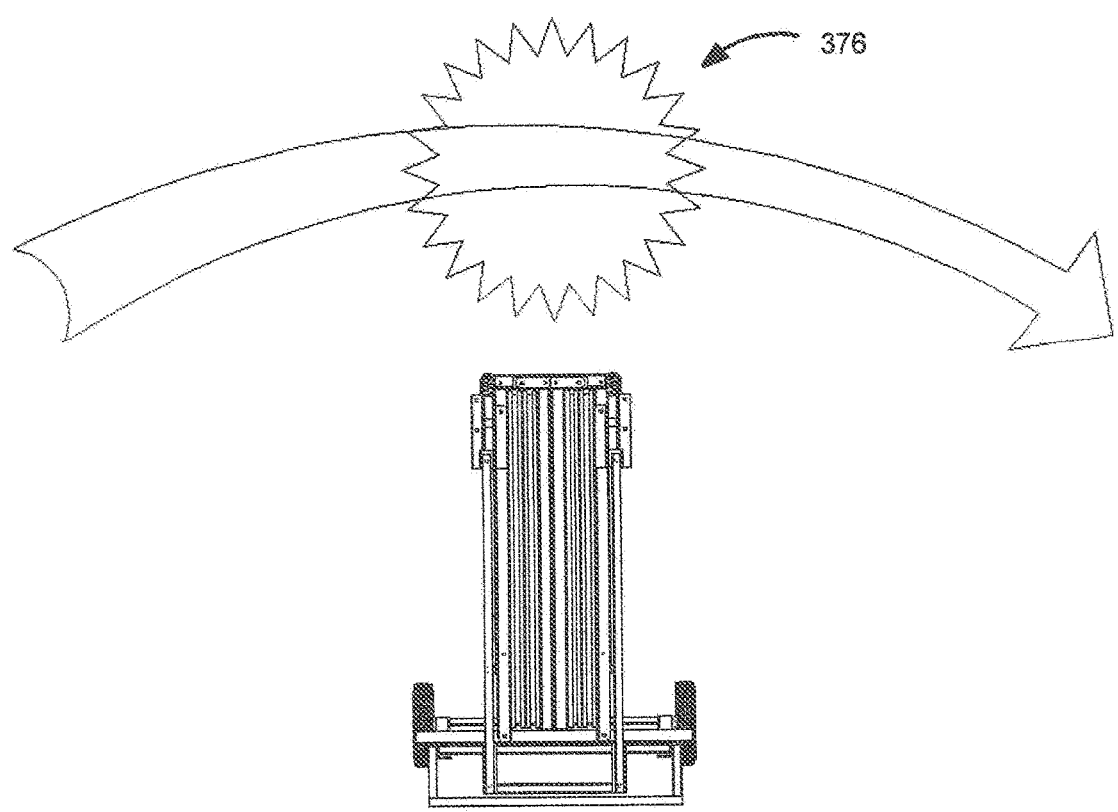
FIG. 27 shows the nominal orientation of an embodiment of the invention with respect to the path of the sun.

FIG. 27 shows the recommended orientation of the cart system as the first step of deployment with respect to the path of the sun. The center of the path (376) should be roughly south in nature By way of example and without limitation, one embodiment of the present invention is described below. Currently, the most common sizes of rigid-frame solar panels intended for rooftop mounting are 60-cell and 72-cell. The smaller, 60-cell, typically have a dimension of 39" across and 69" tall. In this example, the smaller of the two common sizes is utilized. It is to be appreciated that larger versions could easily be scaled up for 72-cell panels, or ultimately any size panel in this range. By selecting the 60-cell panels, the objective in this example is to deliver a quickly-deployed system with the nominal full-sun output capacity of 1000 watts or more. Installing four 260-watt panels achieves this goal. Thus, the design goals for this example system are:

1) Hold four 60-cell solar panels of 39" of width;
2) Can be moved about and deployed by one person of reasonable strength;
3) System locks into place open or folded to maximize wind resistance;
4) Weather-resistant;
5) Folded system can pass through a standard 36" doorway;
6) Folded system or systems can fit into and be transported in a pickup truck bed;
7) Folded system has minimal footprint for storage;
8) Disassembled components lay near flat for easy shipment or to fit into a SUV;
9) Deployed system automatically assumes a fixed angle to the sun;
10) Simple substitution of minimal parts creates alternate angles of use;
11) Stable during setup, and stable enough to withstand 25 mph wind
12) Optional adjustable angle.

With these features, this example foldable solar array support system would be the basis for a much more effective backup power system for emergencies than others currently on the market. The foldable array is still small enough to be transported in the back of a pickup truck, thus expanding its potential use. Additionally, the foldable array system is also small enough for more than one unit to be transported in a pickup truck or larger vehicle at the same time.

The user of a system of this example may configure the electrical output of the solar panels held in this foldable array in a number of ways. Some of these are:

1) Grid-tie use to offset home energy consumption and reduce electricity bills;
2) Inline backup UPS-style use to augment intermittent or unreliable power;
3) Stand-alone electrical power source with an added battery and inverter package;
4) Any other use that can make use of the output of four 60-cell solar panels.

Easy access to the wiring on the back of the solar panels allows for a variety of electrical configurations, troubleshooting or electrical reconfiguration.

By way of example and without limitation, an embodiment of the present invention may be setup, used and taken down as follows:

Before assembling any embodiment of a fold array, the user should check to make sure the necessary parts are available. In this particular embodiment, the following non-exclusive list of parts (see FIG. 1) may be used:

| REFERENCE | QUANTITY | ITEM |
| --- | --- | --- |
| 10 | 1 | cart |
| 20 | 1 | ⅝" axle rod |
| 30 | 2 | 10" rubber tires |
| (ns) | 2 | 1¼" cotter pins (not shown individually) |
| 40 | 1 | swinging brace |
| 50 | 2 | RH inner panel arms |
| 60 | 2 | RH outer panel arms |
| 70 | 2 | LH inner panel arms |
| 80 | 2 | LH outer panel arms |
| 90 | 2 | control arms |
| 100 | 1 | RH diagonal leg |
| 110 | 1 | LH diagonal leg |
| 120 | 2 | 6" swivel casters |
| 130 | 2 | storage/handling braces |
| (ns) | 4 | ⅝" washers (not shown individually) |
| 201 | 22 | ⅜" × 1" stainless steel hex bolts |
| 204 | 14 | ⅜" stainless steel fender washers |
| 202 | 36 | ⅜" stainless steel regular washers |
| 206 | 22 | ⅜" stainless steel lock nuts |
| (ns) | 20 | ⁵⁄₁₆" × ¾" stainless steel hex bolts (not shown individually) |
| (ns) | 44 | ⁵⁄₁₆" stainless steel washers (not shown individually) |
| (ns) | 20 | ⁵⁄₁₆" stainless steel lock nuts (not shown individually) |
| 320 | 8 | ¼-20 stainless steel hex bolts (shown as a group) |
| 320 | 16 | ¼" stainless steel washers (shown as a group) |
| 320 | 8 | ¼-20 stainless steel wing nuts (shown as a group) |
| (ns) | 1 | drill template (not shown) |
| (ns) | 1 | instruction book (from which this section excerpted from) |

This exemplary embodiment of the invention is designed to use REC Peak Energy Z-Link 260 watt 60-cell panels, although other panels with other wattages having a nominal width of approximately 39 inches may also be used. A vertical spacing of 39" (centers) and 37" horizontal (centers) is desirable for the screw holes in the solar panel frames. The holes should be ⁵⁄₁₆" in diameter. In some cases, additional holes are needed on the back of the solar panel frames. If additional holes are needed, the following procedure is recommended:

1) Place the drill template (not shown) along one of the long edges of the aluminum panel frame and centered along that side.

2) Place a small block of wood and/or firm metal under the edge of the frame where the holes will be drilled to protect the back of the solar panel.
3) Using a ⅛" drill bit, be careful to drill a pilot hole only through the first layer of the aluminum frame.
4) Using a shallow stepped drill bit and with equal care, enlarge the holes to 5/16 inches.

The cart of this exemplary embodiment may be assembled as follows: First, the axle and wheels are attached to the cart. This may require the cart 10, axle 20, 10" fixed wheels 30, ⅝" washers (not shown) and cotter pins (not shown). The axle should be slid through the axle protector at the bottom of the cart frame. A washer should be placed on either side of the wheel and all three should be slipped onto one end of the axle. A cotter pin should be used at each end, with tabs bent out enough to stay in place. Some wheels have different tolerances and if everything does not fit at once, the inner washers may be removed for more space. Repeat this procedure for the wheel 30 on the other side of the cart.

The angular legs 100, 110 are then prepared by attaching the swivel wheels to the angular legs with ⅜" bolts 201, two ⅜" washers 202 and a ⅜" lock nut 206. This is done for both legs. These should be well tightened. For panel arms, the open side should face the top of the panel.

The solar panels are then attached to the arms (FIG. 26). First, the eight panel arms two each of 50, 60, 70 and 80 and four solar panels 140 should be located. Each panel will use two identical arms. Note the orientation of the solar panel with respect to the wiring box 375 at the top of the rear of the solar panel. Each mounting point should use a 5/16"×¾" set of hardware (bolt, nut & two washers; not shown). Depth should be checked before starting, after which the bolt is dropped through panel arm and hole in back of solar panel 140 frame. There should be a gap between the bolt end and the solar panel.

The first framed panel is then ready to be attached to the cart 10. The RH inner panel should be checked to confirm that its vertical spacing for the arms (50 or 70) matches the ones on the cart 10. Using at least 2 people, the cart should be raised enough to position the panel onto the frame. The curved end of the framed panel arms should be set on top of the metal frame of the cart. A ⅜" bolt 201 should be dropped through each hole to keep the frame from sliding around but without the nut (for now). Before adding the nut, a ⅜" fender washer 204 slides in between the panel frame arm and the cart frame. A regular ⅜" washer is then added to the top and bottom before threading the lock nut 206. The nut should be tightened fully then backed it off ⅛ turn. The same should be done for the other nut. This is the integrated hinge that will be used frequently in this system.

At this point, one of the triangular legs should be completed to help keep the cart stable for the rest of the assembly.

To attach the first diagonal leg, the RH leg 100 should be located and attached to the inner panel frame 50 & 50. The same stack of ⅜" hardware should be used as was used for the frame to cart attachment. Once the two sets of hardware are attached and backed off ⅛ turn, one set of ¼-20 hardware should be installed as shown (FIG. 7) to keep the leg up against the inner panel frame. This is the wing lock. This should not be left unattended as it can still roll to an unstable condition. A stabilizer control arm 90 and two sets of 5/16" hardware (bolt 201, three washers 202 and one nut 206 should be located. This is the same stack as the ⅜" except the center washer is a regular washer. Both ends of the stabilizer arm should be attached to the top of the triangular leg and cart.

The other inner panel and triangular leg should then be attached (FIG. 3). The following steps are the only time a user should open any of the panels with the cart upright and only one at a time. CAUTION: NEVER OPEN BOTH SIDES WHILE THE CART IS STANDING UPRIGHT. This will cause an unsafe condition which could result in a catastrophic fall.

Next is installation of the outer panels. After locating one of the outer panel frames, the ¼-20 hardware is removed from the wing lock on one side. The panel should be swung out far enough to reach the inside of the group. The corresponding outer panel frame, with mounting arms attached, is then bolted on place in the same fashion as the inner panel except that the hinge is away from the cart. Then this is folded back up, re-secured with the ¼-20 hardware and repeated for the other side.

The storage stabilizers are attached next. The stabilizer 130 attaches to the hinge sets away from the cart. A ¼-20 wing nut group is used on either end, one on each hinge group.

If the swinging brace 40 is not pre-assembled, it is attached as follows. The brace sits inside the cart chassis with ⅜" fender washers in between. Set the flat edge away from the cart. Thread ⅜" hardware as before and remember to back off ⅛ turn. This brace rotates down for storage but will later be raised and rest against the lower cart handle when deployed.

The exemplary array may now be used. It is to be noted that the rig should always be handled by the gray steel parts, not by the solar panels or their frames. To deploy the folded array (Fold Array) the following steps should be used:

1) Move the folded cart to a place with good visibility to the arc of the sun (FIG. 27). Estimate the center of that arc 376 and point the cart toward it. This will be roughly south. Use more than one person if the terrain is rough or uneven.

2) Take off the storage braces (FIG. 16) by removing the wing nuts holding them onto the rig. These are the two pieces of metal 130 holding the hinges on the narrow end together. Save the ¼-20 hardware for pinning the panels later and store the loose braces 130 for later.

3) Tilt the rig back onto the swinging brace (FIG. 5). Place a foot onto the axle protector 105 and pull back on the 101 upper handle. As the rig is lowered, allow the swinging brace 40 to touch the ground. Then push the rig forward to press the brace against the lower handle 102. This is the heaviest part, and may require more than one person to accomplish.

4) Remove one of the diagonal arm pins (FIG. 7). This is another ¼-20 hardware set with a wing nut. Be aware that the angled leg will follow and position itself as that side is lowered to the ground (FIG. 8). Rotate the swivel wheel 120 to allow the rig to lay flat. If on near-level ground, use the ¼-20 hardware to pin down the inner wing panel that was just lowered. Repeat for the other side. If the rig has to be lifted to get the pins in place, this should not be done by lifting on any solar panel directly. In the event of very uneven ground, these pins might not be practical to use.

5) Open the outer wings by lifting on the gray steel arms. When fully open (FIG. 12), these can also be pinned (FIG. 13). Use the same hole as the storage brace which should now line up with the hole in the opposite side of the hinge.

6) Follow the instructions on placement and hook-up of the inverter package selected by the user.

7) Disassembly is the reverse of assembly.

By way of example, and without limitation, the following simplified procedure (in plain language) may be followed by persons already experienced in the nuances of this exemplary embodiment to deploy an array of the present invention (refer to FIG. 17 for the following):

1) Position cart facing estimated center of day's sunshine path (also see FIG. 27).
2) Remove two storage braces 130 and set braces and ¼" hardware aside 370 and (also see FIG. 16).
3) Using upper cart handle, tilt the rig backwards until swinging brace touches the ground (also see FIG. 5).
4) Push the rig forward until swinging brace rests against lower cart handle 371 (also see FIG. 6).
5) Remove wing nut (also see FIG. 7; 320) on one side of angled leg and unfold leg to the ground (also see FIG. 7 and FIG. 8).
6) Repeat same for other side 372.
7) Re-attach four wing nuts sets as needed to stabilize wing panel frames.
8) Un-fold the outer solar panels 373 and (also see FIG. 11 and FIG. 12).
9) These can also be pinned at the hinges for additional stability (also see FIG. 13).
10) Attach DC power cable to inverter package.
11) Re-folding unit for storage/transport is opposite of deployment steps.

Set forth below is a sample set of specifications for one embodiment of the present invention:

| Dimensions folded: | 32.500" wide | 50.125" deep | 75.750" tall |
|---|---|---|---|
| Dimensions open: | 173.250" wide | 63.125" deep | 43.375" tall |
| Nominal angle of tilt: | 32 degrees | (for this example) | |
| Weight of frame only: | 131 pounds | | |
| Weight w/ solar panels: | 304 pounds | (with four 43# solar panels) | |
| Frame shipping weight: | 160 pounds | (crated) | |

In many embodiments, the frame may be welded from ordinary steel and will rust if given the chance. It is recommended that any places that have the paint scraped off be restored periodically with an anti-rust product or flat primer gray. The bottoms of the swinging brace (40) and diagonal legs that come in contact with the ground (110, 120, 170 and 180) are more likely to need this from time to time. One way to limit scraping damage is to wrap the part of the legs that touches the ground with pipe insulation or a foam pool noodle.

In many embodiments, lubrication is important. A coat of grease or oil will slow down the natural deterioration of the integrated hinges. A 40 weight lubricating oil or spray lithium grease should be used. The wheel bearings including the swivel for the front wheels should also be periodically lubricated.

The efficiency of most solar panels is directly affected by anything that reduces the sunlight. It is therefore recommended that the (blue) surface of the solar panels be wiped down with a glass cleaner at the beginning of every deployment and whenever dirt accumulates on the surface of the panels. Periodic cleaning of the rest of the system can be accomplished with a garden hose and medium-hard brush like might be used for washing a car. Everything should be allowed to dry before moving to storage.

It is to be appreciated that solar panels are made of glass, so the rig should be stored or deployed away from objects that might fall onto the rig. If storing more than one rig, they can be alternated facing opposite directions to make best use of storage space. It is possible, but not recommended that the rig can be placed on its back. Remember that it is very heavy and the swinging brace will be in the way.

For transport, the storage braces should be installed when moving the array from one place to another. If the rig can be kept upright, that will be the best way to move it. If not, it can be tilted onto its back to load onto the bed of a pickup truck. Be sure to strap it down either way. An additional strap around the middle of the rig is also recommended. The ratchet mechanism or any metal parts of the strap should be kept well away from the glass surface (front or back) of the solar panels.

It is to be understood that variations and modifications of the present invention may be made without departing from the scope thereof. In particular, and without limitation, each of the various features and/or aspects of each embodiment disclosed herein may be used with other features and/or aspects of other embodiment disclosed herein in different combinations. Other combinations of features of the various embodiments disclosed herein are also included within the scope of the invention. It is also to be understood that the present invention is not to be limited by the specific embodiments disclosed herein, but only in accordance with the appended claims when read in light of the foregoing specification.

What is claimed is:

1. A hinge for opening not more than 180° comprising:
   a first L-shaped flange comprising a first base member and a first side member wherein a bolt hole is provided at an end of said first base member;
   a second L-shaped flange comprising a second base member and a second side member wherein a second bolt hole is provided on said second base member;
   a bolt extending through said first and second bolt holes forming a pivot around which said first and second flanges may rotate;
   wherein said hinge may be opened by rotating one of said flanges in one direction around the pivot until said side members make contact with each other, and wherein said hinge may be closed by rotating said one flange in an opposite direction around the pivot until the base member of said first flange makes contact with the side member of said second flange.

2. The hinge of claim 1 wherein said second bolt hole is provided at one end of said second base member.

3. The hinge of claim 2 further comprising extensions at said ends of said first and second base members wherein said bolt holes are located on said extensions.

4. The hinge of claim 3 wherein edges of said extensions are rounded.

5. The hinge of claim 3 further comprising a washer provided between said bolt holes.

6. A hinge for opening not more than 180° comprising:
   a first flange having an L-shaped cross-section comprising a first flat base member and a first flat side member that is perpendicular to said first base member wherein said first base member includes a first rounded extension at an end thereof, said extension having a first opening therein for receiving a bolt;
   a second flange adjacent to said first flange, said second flange having an L-shaped cross-section comprising a second flat base member and a second flat side member that is perpendicular to said second base member wherein said second base member includes a second rounded extension at an end thereof, said extension having a second opening therein for receiving said bolt;

a bolt extending through said first and second openings forming a pivot around which said first and second flanges may rotate;

wherein said hinge may be opened by rotating one of said flanges in one direction around the pivot until said side members make contact with each other, and wherein said hinge may be closed by rotating said one flange in an opposite direction around the pivot until a base member of one of said flanges makes contact with a side member of the other of said flanges.

7. A hinge for opening not more than 90° comprising:

a first flange having an L-shaped cross-section comprising a first flat base member and a first flat side member that is perpendicular to said first base member wherein said first base member includes a first rounded extension at an end thereof, said extension having a first opening therein for receiving a bolt;

a second flange adjacent to said first flange, said second flange having an L-shaped cross-section comprising a second flat base member and a second flat side member that is perpendicular to said second base member, said second base having a second opening therein for receiving said bolt;

a bolt extending through said first and second openings forming a pivot around which said first flange may rotate;

wherein said hinge may be opened by rotating said first flange in one direction around said pivot until said side members make contact with each other, and wherein said hinge may be closed by rotating said first flange in an opposite direction around the pivot until the base member of said first flange makes contact with the side member of said second flange.

\* \* \* \* \*